US008542731B2

United States Patent
Tourapis et al.

(10) Patent No.: US 8,542,731 B2
(45) Date of Patent: Sep. 24, 2013

(54) METHOD AND APPARATUS FOR VIDEO CODEC QUANTIZATION

(75) Inventors: Alexandros Michael Tourapis, Santa Clara, CA (US); Jill MacDonald Boyce, Manalapan, NJ (US); Peng Yin, West Windsor, NJ (US)

(73) Assignee: Thomson Licensing, Boulogne-Billcourt (FR)

( * ) Notice: Subject to any disclaimer, the term of this patent is extended or adjusted under 35 U.S.C. 154(b) by 1997 days.

(21) Appl. No.: 11/628,825

(22) PCT Filed: Jun. 3, 2005

(86) PCT No.: PCT/US2005/019647
§ 371 (c)(1),
(2), (4) Date: Dec. 7, 2006

(87) PCT Pub. No.: WO2006/007279
PCT Pub. Date: Jan. 19, 2006

(65) Prior Publication Data
US 2008/0080615 A1    Apr. 3, 2008

Related U.S. Application Data

(60) Provisional application No. 60/581,019, filed on Jun. 18, 2004.

(51) Int. Cl.
*H04N 7/12* (2006.01)
(52) U.S. Cl.
USPC .................................................. 375/240.04
(58) Field of Classification Search
USPC ........................................ 375/240.01, 240.28

IPC ......................................................... H04N 7/12
See application file for complete search history.

(56) References Cited

U.S. PATENT DOCUMENTS 5,295,203 A    3/1994  Krause et al.
5,473,377 A    12/1995 Kim (Continued)

FOREIGN PATENT DOCUMENTS

EP    0751687 A2    6/1996
JP    4259182        9/1992

(Continued)

OTHER PUBLICATIONS

Przelaskowski A ED-Institute of electrical and electronics engineers: "Statistical modeling and treshold selection of wavelet coefficientsin lossy image coder" 2000 IEEE international conference on acoustics speech, and signal processing. proceedings (ICASSP). Istanbul, Turkey, Jun. 5-9, 2000, IEEE International Conference on Acoustics, Speech and Signal Processing (ICASSP), New York, NY IEEE, US, vol. vol. 4 of 6, Jun. 5, 2000, pp. 2055-2058, XP000993640 ISBN: 0-7803-6294-2 the whole document.

(Continued)

*Primary Examiner* — Gims Philippe
(74) *Attorney, Agent, or Firm* — Robert D. Shedd; Paul P. Kiel; Xiaoan Lu

(57) ABSTRACT

An encoder, a decoder, and corresponding methods are provided for encoding and decoding video signal data for an image block. The encoder includes a quantizer for receiving transform coefficients for the image block, and for adaptively performing dead-zone quantization based on coefficient positions and coefficient distributions of the transform coefficients.

16 Claims, 20 Drawing Sheets

(56) References Cited

U.S. PATENT DOCUMENTS

| | | | |
|---|---|---|---|
| 6,560,584 B1 * | 5/2003 | Afshar et al. | 706/21 |
| 7,580,584 B2 * | 8/2009 | Holcomb et al. | 382/239 |
| 2004/0028128 A1 | 2/2004 | Sugiyama et al. | |

FOREIGN PATENT DOCUMENTS

| | | |
|---|---|---|
| JP | 4362886 | 12/1992 |
| JP | 2003230142 | 8/2003 |
| KR | 1993-0020898 | 10/1993 |

OTHER PUBLICATIONS

Knox Carey W et al: "Smoothness-constrained wavelet image compression" Proceedings of the International Conference on Image Processing (ICIP) Lausanne, Sep. 16-19, 1996, New York, IEEE, US, vol. vol. 1. Sep. 16, 1996, pp. 569-572, XP010202721 ISBN: 0-7803-3259-8 p. 570-p. 571, paragraph 4 figure II.

Yanbin Yu et al: "Interlace Video Coding With Field-Based Multiresolution Representation" Signal Processing. Image Commumication, Elsevier Science Publishers, Amsterdam, NL vol. 5 No. 1/2, Feb. 1, 1993, pp. 185-198, XP000345620 ISSN: 0923-5965 p. 191-p. 197, paragraph 5.

Peterson et al., "An Improved Detection Model for DCT Coefficient Quantization", Proceedings of the SPIE, 1993, pp. 191-201.

Tourapis et al., "Performfance Evaluation of the 8×8 Transform vs. Coefficient Adaptive Deadzone Consideration", ISO/IEC JTC1/SC29/WG11 and ITU-T Q6/SG16, Document: JVT-K035, Munich, Germany, Mar. 2004.

Tao, "On Optimal Entropy-Constrained Deadzone Quantization", IEEE Transactions on Circuits and Systems for Video Technology, vol. 11, Apr. 2001, pp. 560-563.

Lam et al., "A Mathematical Analysis of the DCT Coefficient Distributions for Images", in IEEE Trans. on Image Processing, vol. 9, No. 10, 2000, pp. 1661-1666.

Malvar et al., "Low-Complexity Transform and Quantization in H.264/AVC", IEEE Transactions on Circuits and Systems for Video Technology, vol. 13, Jul. 2003, pp. 598-603.

Lu et al., "Proposal of Quantization Weighting for H.264./MPEG-4 AVC Professional Profiles", ISO/IEC JTC1/SC29/WG11 and ITUT Q6/SG16, Document: JVT-K035, Munich, Germany, Mar. 2004.

Wedi et al., "Quantization with an Adaptive Dead Zone Size for H.264/AVC FRExt", ISO/IEC JTC1/SC29/WG11 and ITU-T Q6/SG16, Document: JVT K026, Munich, Germany, Mar. 2004.

* cited by examiner

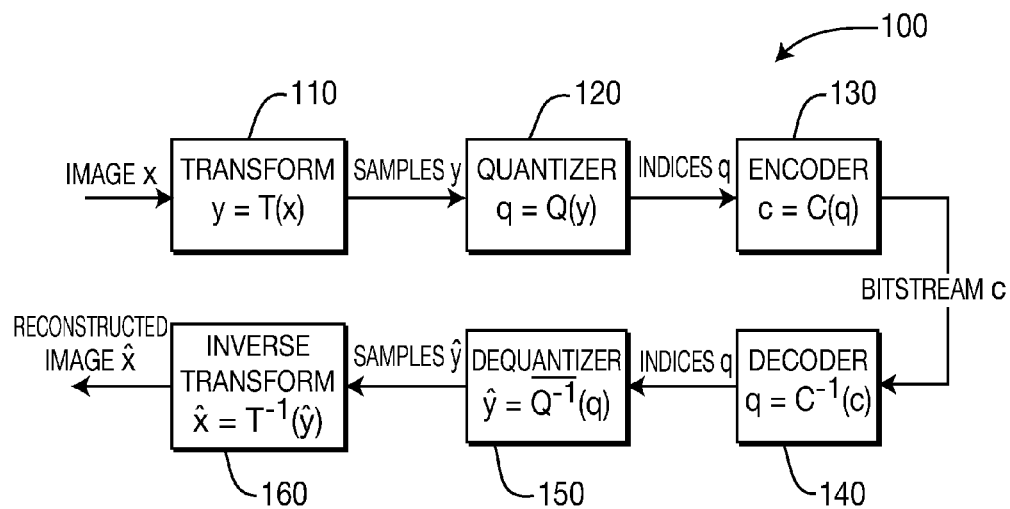
FIG. 1
(PRIOR ART)
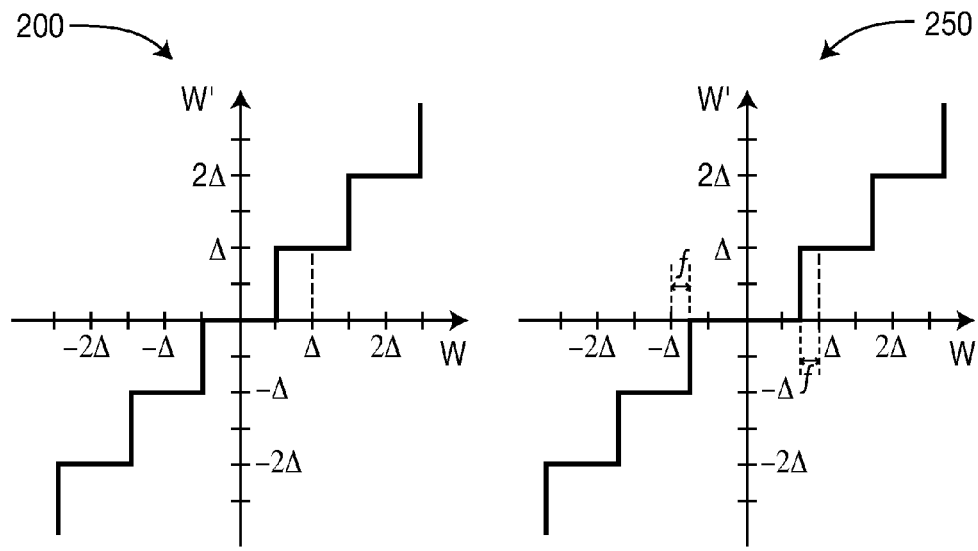
FIG. 2A
(PRIOR ART)
FIG. 2B
(PRIOR ART)

METHOD AND APPARATUS FOR VIDEO CODEC QUANTIZATION

CROSS-REFERENCE TO RELATED APPLICATIONS

This application claims the benefit, under 35 U.S.C. §365 of International Application PCT/US2005/019647, filed Jun. 3, 2005, which was published in accordance with PCT Article 21(2) on Jan. 19, 2006 in English and which claims the benefit of U.S. provisional patent application No. 60/581,019, filed Jun. 18, 2004.

FIELD OF THE INVENTION

The present invention generally relates to encoders and decoders and, more particularly, to a method and apparatus for quantization in video encoders and decoders.

BACKGROUND OF THE INVENTION

Currently most image and video coding systems and standards such as MPEG-2 and JVT/H.264/MPEG AVC use transform based techniques followed by quantization and entropy coding for performing compression. Turning to FIG. 1, a typical transform based compression system is indicated generally by the reference numeral 100. An input to the transform based compression system 100 is connected in signal communication with an input of a transformer 110. An output of the transformer 110 is connected in signal communication with an input of a quantizer 120. An output of the quantizer 120 is connected in signal communication with an input of an encoder 130. An output of the encoder 130 is connected in signal communication with an input of a decoder 140. An output of the decoder 140 is connected in signal communication with an input of a dequantizer 150. An output of the dequantizer 150 is connected in signal communication with an input of an inverse transformer 160. An output of the inverse transformer 160 is an externally available output of the system 100. The key idea is that such transforms, such as the Discrete Cosine Transform (DCT), de-correlate the image signal and compact the energy of an image block into a few low pass coefficients, which after quantization and de-quantization could still represent the signal rather accurately. Nevertheless, this quantization/de-quantization process needs to be carefully designed in order to have the best possible subjective and objective quality. A great deal of past research was primarily directed to the 8×8 DCT used in JPEG and MPEG-like encoders, and has focused on the design of the quantization process, and in particular with regards to the optimal quantization step size that is to be used, coefficient distribution and dead-zoning mechanisms. One of the most important observations was that coefficient distribution, in most cases, followed a Laplacian distribution that enabled a more accurate modeling and design of the quantization process. This assumption is followed within the design of many modern codecs and encoders, including H.264 in an attempt to improve Rate Distortion (RD) performance.

However, although the Laplacian distribution holds true for many cases (including for some material coded with H.264), due to the introduction of a new smaller (4×4) transform in the H.264 standard, and the consideration of the standard for a wide range of applications including high definition TV, broadcasting, video-conferencing, and so forth, there are cases that such distribution does not always hold true. One such application in particular is the encoding of Film Grain content where distribution can be better approximated for certain coefficients using a Gaussian or generalized Gaussian distribution. This suggests that techniques used to better fit Laplacian distributions might not be appropriate for encoding such content, especially at high bitrates (small quantization step sizes) resulting in poor subjective and objective performance. Although some of the past research also suggests that the distribution could be different (Gaussian, Cauchy, Generalized Gaussian, and so forth), they generally provide rather complex models for the design of the quantization process.

It is well documented that the distribution of the DCT AC coefficients, follows in many cases a Laplacian distribution:

$$p(x) = \frac{\lambda}{2} e^{-\lambda |x|}$$

Based on this observation previous research tried to estimate a Laplacian distribution that could fit to the actual coefficient distribution of the source, and based on that design the weighted quantization matrices and the dead-zone that is to be used during quantization. The simplest way to find such a parameter is to use the standard deviation:

$$\sigma^2 = \int_{-\infty}^{\infty} (x - E(x))^2 p(x) dx = \frac{2}{\lambda^2} \Rightarrow \lambda = \frac{\sqrt{2}}{\sigma}$$

This estimate is done separately for each one of the AC coefficients, while also the same process is independently applied to the chroma AC coefficients as well.

The above-described process enables an adaptive design of the quantization process, for example for the selection of the optimal reconstruction values or the design of the quantization matrices. Such a process could for example be performed where the quantization factor (Q) that also results in the smallest mean squared error is first determined:

$$MSE = \min_Q 2 \left( \sum_{k=1}^{k=M} \int_{kQ-\frac{Q}{2}}^{kQ+\frac{Q}{2}} (k - kQ)^2 p(x) dx + \int_{MQ+\frac{Q}{2}}^{\infty} (x - MQ)^2 p(x) dx \right)$$

$$= \min_Q 2 \left( \sum_{k=1}^{k=M} \int_{kQ-\frac{Q}{2}}^{kQ+\frac{Q}{2}} (x^2 - 2kQx + k^2 Q^2) \frac{\lambda}{2} e^{-\lambda x} dx + \int_{MQ+\frac{Q}{2}}^{\infty} (x - MQ)^2 \frac{\lambda}{2} e^{-\lambda x} dx \right)$$

$$= \min_Q \left( \sum_{k=1}^{k=M} e^{-\lambda x} \left[ 2kQx + \frac{2kQ}{\lambda} - k^2 Q^2 - x^2 - \frac{x}{\lambda^2} - \frac{1}{\lambda} \right] \Big|_{kQ-\frac{Q}{2}}^{kQ+\frac{Q}{2}} + e^{-\lambda x} \left[ 2kQx + \frac{2kQ}{\lambda} - k^2 Q^2 - x^2 - \frac{x}{\lambda^2} - \frac{1}{\lambda} \right] \Big|_{MQ+\frac{Q}{2}}^{\infty} \right)$$

It has been claimed that the above could be easily evaluated to determine the best quantization values, and then determine a table of perceptually weighted coefficients experimentally. The decision of the base matrix is then performed by multiplying each MSE-optimal Q with the perceptual weighting, and then collecting them into a matrix, which is finally scaled and rounded as appropriate for the given bitrate.

Nevertheless, other work tries to disprove the claim of Laplacian distribution, with the claim that the distribution is closer to Gaussian or a Generalized Gaussian, i.e., following the distribution model:

$$f(x) = \frac{v\alpha(v)}{2\sigma\Gamma\left(\frac{1}{v}\right)} e^{-[\alpha(v)|\frac{x}{\sigma}|]^v} \text{ with } \alpha(v) = \sqrt{\frac{\Gamma\left(\frac{3}{v}\right)}{\Gamma\left(\frac{1}{v}\right)}}$$

where $\Gamma(\cdot)$ denotes the gamma function $$\left(\Gamma(z) \equiv \int_0^1 \left[\ln\left(\frac{1}{t}\right)\right]^{z-1} dt\right)$$

and $v$ and $\sigma$ are positive real values. Note that $\Gamma(\cdot)$ for n integer values becomes $\Rightarrow \Gamma(n)=(n-1)!$ while for half integer arguments $\Gamma(n/2)$ has another special form which is:

$$\Gamma\left(\frac{1}{2}n\right) = \frac{(n-2)!!\sqrt{\pi}}{2^{\frac{(n-1)}{2}}},$$

where n!! is a double factorial. The first few values for n=1, 3, 5, . . . are therefore:

$$\Gamma\left(\frac{1}{2}\right) = \sqrt{\pi}$$
$$\Gamma\left(\frac{3}{2}\right) = \frac{1}{2}\sqrt{\pi}$$
$$\Gamma\left(\frac{5}{2}\right) = \frac{3}{4}\sqrt{\pi}$$

It is immediately observed that for $v=1$ and $v=2$, the above generalized Gaussian becomes a Laplacian or Gaussian PDF respectively. Maximum likelihood approach is used for fitting the statistics of a given image or sequence in order to provide the $v$ and $\sigma$ parameters, which are then used in similar fashion as with the Laplacian case to determine the optimal quantization values.

The H.264 standard until recently did not provide any mechanism to benefit from such properties during the quantization process. More specifically, the standard does not specify how the encoder should perform rounding during quantization, while it only specifies how the decoder reconstruction levels are computed using uniform quantization. The H.264 reference software on the other hand made the assumption that coefficients, both DC and AC, satisfied a Laplacian distribution based on which fixed rounding (⅓ for intra and ⅙ for inter coding) was used. Unfortunately, the coefficients are frequently not Laplacian distributed, resulting in very poor subjective and objective performance within many H.264 encoder implementations, especially at higher bitrates and resolutions. This is partly because the standard only considered a 4×4 transform, thus de-correlating coefficients less efficiently, while also the equal step quantizers and the rather aggressive dead-zoning process tends to throw away most of the AC coefficients even at high bitrates. For this purpose, the 8×8 transform was reintroduced in the standard, while also quantization matrices were also adopted allowing a finer tuning of the quantization process. An alternative method was also proposed that allowed a modification of the reconstructed coefficient value with lower complexity than the quantization matrices process. Based on this approach, instead of performing the quantization and de-quantization of a coefficient equal to W using an equation of the form:

$$Z = \text{int}\left(\frac{|W|+f}{\Delta}\right) \cdot \text{sgn}(W) \text{ and } W' = \Delta \cdot Z$$

where Z is the final quantized level, $\Delta$ is the quantization step-size, and f serves as a rounding term for the quantization process (see FIGS. 2A and 2B), quantization is performed using an equation of the form:

$$Z = \text{int}\left(\frac{|W|+\Theta+f}{\Delta}\right) \cdot \text{sgn}(W),$$
$$\text{and } W' = (\Delta \cdot |Z| - \Theta) \cdot \text{sgn}(Z)$$

where now $\Theta$ is an additional parameter that allows of an offsetting of the final reconstruction value (see FIG. 3). This effectively reduces the probability that a coefficient is set to zero thus resulting possibly in reduced subjective and even objective performance. Turning to FIG. 2A, the relation between an input signal W and an inverse quantized output signal W' for a uniform quantizer with step-size $\Delta$ and $f=\Delta/2$ is indicated generally by the reference numeral 200. Turning to FIG. 2B, the relation between an input signal W and an inverse quantized output signal W' for a uniform quantizer with step-size $\Delta$ and $f=\Delta/4$ is indicated generally by the reference numeral 250. Turning to FIG. 3, an impact of $\Theta=\Delta/4$ within a quantization process is indicated generally by the reference numeral 300.

SUMMARY OF THE INVENTION

These and other drawbacks and disadvantages of the prior art are addressed by the present invention, which is directed to a method and apparatus for quantization in video encoders and decoders.

According to an aspect of the present invention, there is provided an encoder for encoding video signal data for an image block. The encoder includes a quantizer for receiving transform coefficients for the image block, and for adaptively performing dead-zone quantization based on coefficient positions and coefficient distributions of the transform coefficients.

According to another aspect of the present invention, there is provided a method for encoding video signal data for an image block. The method includes the steps of receiving transform coefficients for the image block, and adaptively performing dead-zone quantization based on coefficient positions and coefficient distributions of the transform coefficients.

According to yet another aspect of the present invention, there is provided a decoder for decoding video signal data for an image block. The decoder comprises a quantizer for receiving transform coefficients for the image block, and for adaptively performing dead-zone quantization based on coefficient positions and coefficient distributions of the transform coefficients.

According to a further aspect of the present invention, there is provided a method for decoding video signal data for an image block. The method includes the steps of receiving transform coefficients for the image block, and adaptively performing dead-zone quantization based on coefficient positions and coefficient distributions of the transform coefficients.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which:

FIG. 1 shows a block diagram for a typical transform based compression system according to the prior art;

FIGS. 2A and 2B shows plots of the relations between an input signal W and an inverse quantized output signal W' for a uniform quantizer with step-size $\Delta$ and $f=\Delta/2$ and $f=\Delta/4$, respectively;

DETAILED DESCRIPTION OF PREFERRED EMBODIMENTS

Figure 3:
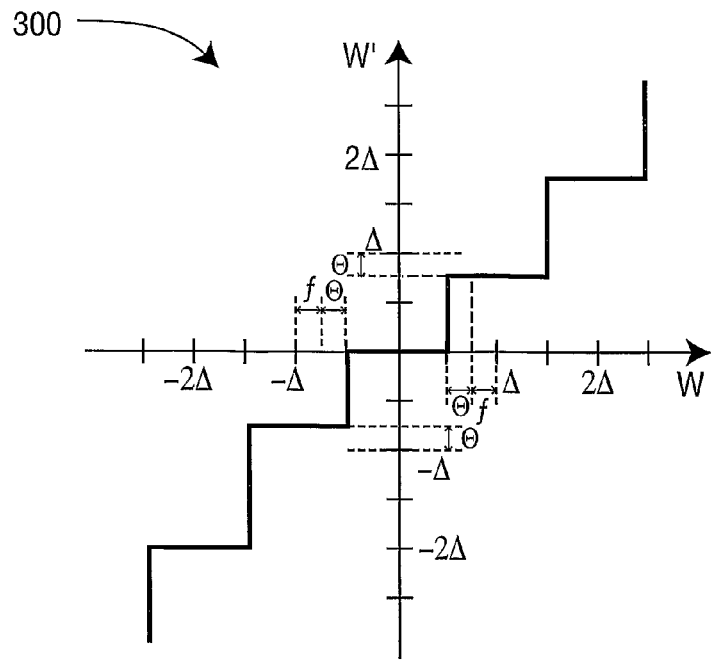
FIG. 3 shows a plot of an impact of $\Theta=\Delta/4$ within a quantization process.

The present invention is directed to method and apparatus for quantization in video encoders and decoders.

Considering that in transform based image and video coding, AC coefficients tend to have sharp concentrations around zero in their distribution, dead-zone quantization is used in an attempt to achieve good rate-distortion performance. Design of the dead-zone quantization methods is usually performed with the assumption that coefficients follow a Laplacian or Gaussian (Normal) distribution. Unfortunately, in most cases, no consideration of the piecewise distribution (with regards to each corresponding quantization interval) is made, which could result in reduced performance. Furthermore, designs are mostly based on objective measurements that could further lead to visual artifacts and substantially reduced subjective quality. In accordance with the principles of the present invention, several methods are provided that could enable improved subjective quality, and also in many cases objective quality, through adaptively selecting the dead-zone parameters depending on image characteristics, quantization step size, and reconstructed level. Although some of the methods only require consideration within an encoder, other strategies also affect the decoder design, and require that additional information is present within the encoded bitstream.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

In accordance with the principles of the present invention, various embodiments of an apparatus and method are described for the automatic computation of the quantization parameters, such as the dead-zone, the quantization regions for each level, and quantization weighting matrices, that could be used within a transform based image or video encoder. Also disclosed is a new set of quantization offsetting matrices which may be transmitted to the decoder and which provide additional flexibility within the quantization process and can improve subjective and/or objective quality.

In most research on the subject, it is claimed that the AC coefficient distribution in transform-based codecs tends to be Laplacian. This assumption is also followed within the H.264 codec, which tends to especially impact the design of the quantization process. In particular, the dead-zoning process within the H.264 reference software for a coefficient W is performed through the consideration of a fixed rounding factor f as follows:

$$Z = \text{int}\left(\frac{|W| + f}{\Delta}\right) \cdot \text{sgn}(W),$$

where Z is the mapped quantization level, and $\Delta$ is the quantization step-size. By decreasing f, the dead-zone area around the reconstruction value zero is essentially increased, while also for all other levels the quantization region is equally shifted according to f. This process can be better seen in FIG. 2A and FIG. 2b. f was selected equal to $\Delta/3$ for intra slices, and $\Delta/6$ for inter slices in an attempt to approximate such a Laplacian distribution. Turning to FIGS. 2A and 2B, the relations between an input signal W and an inverse quantized (reconstructed) output signal W' for a uniform quantizer with step-size $\Delta$ and f=$\Delta/2$ and f=$\Delta/4$, respectively, is indicated generally by the reference numerals 200 and 250, respectively.

Figure 4:
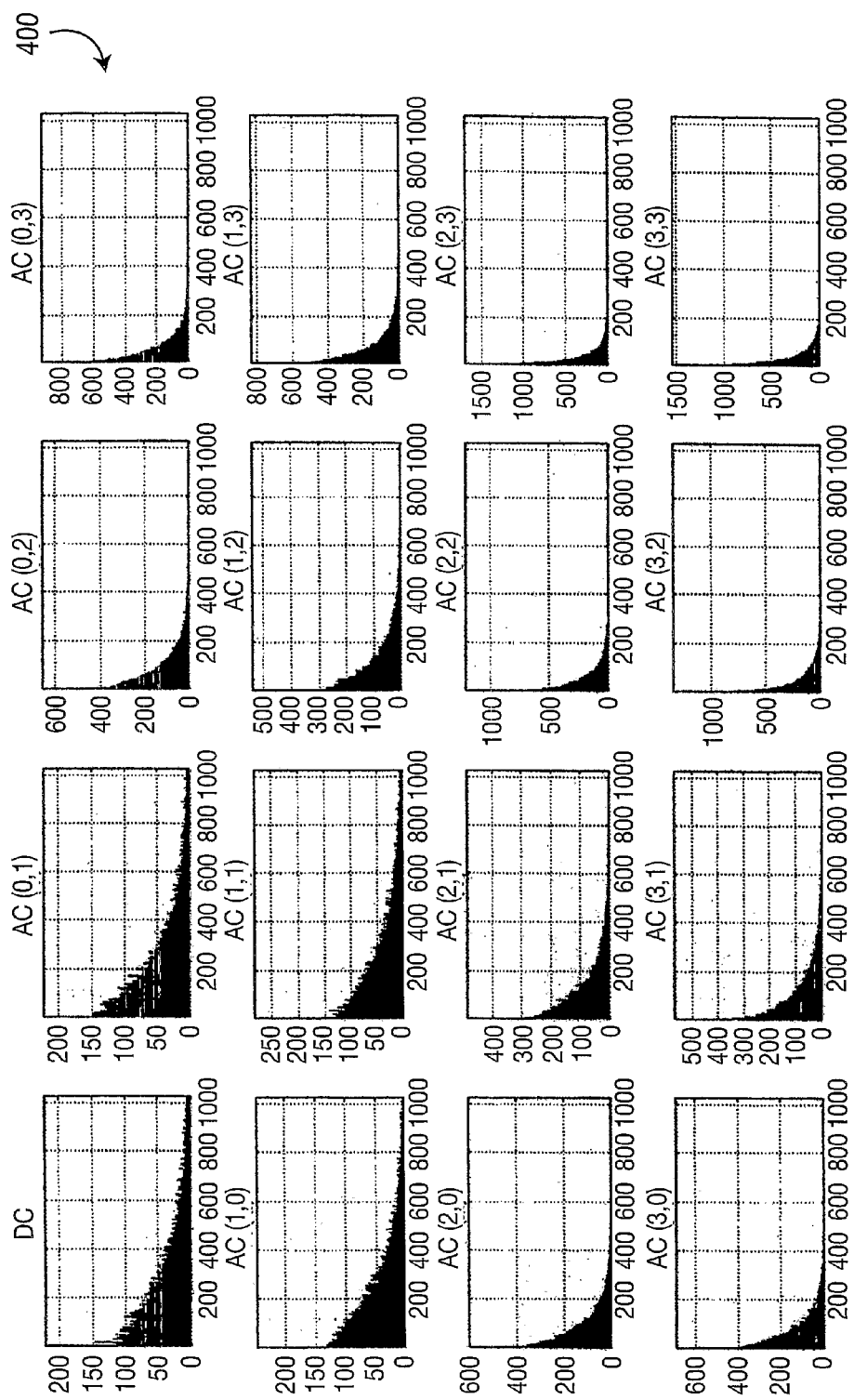
FIG. 4 shows plots for a distribution of transform coefficients for intra coded blocks for a high texture SD sequence.
Figure 5:
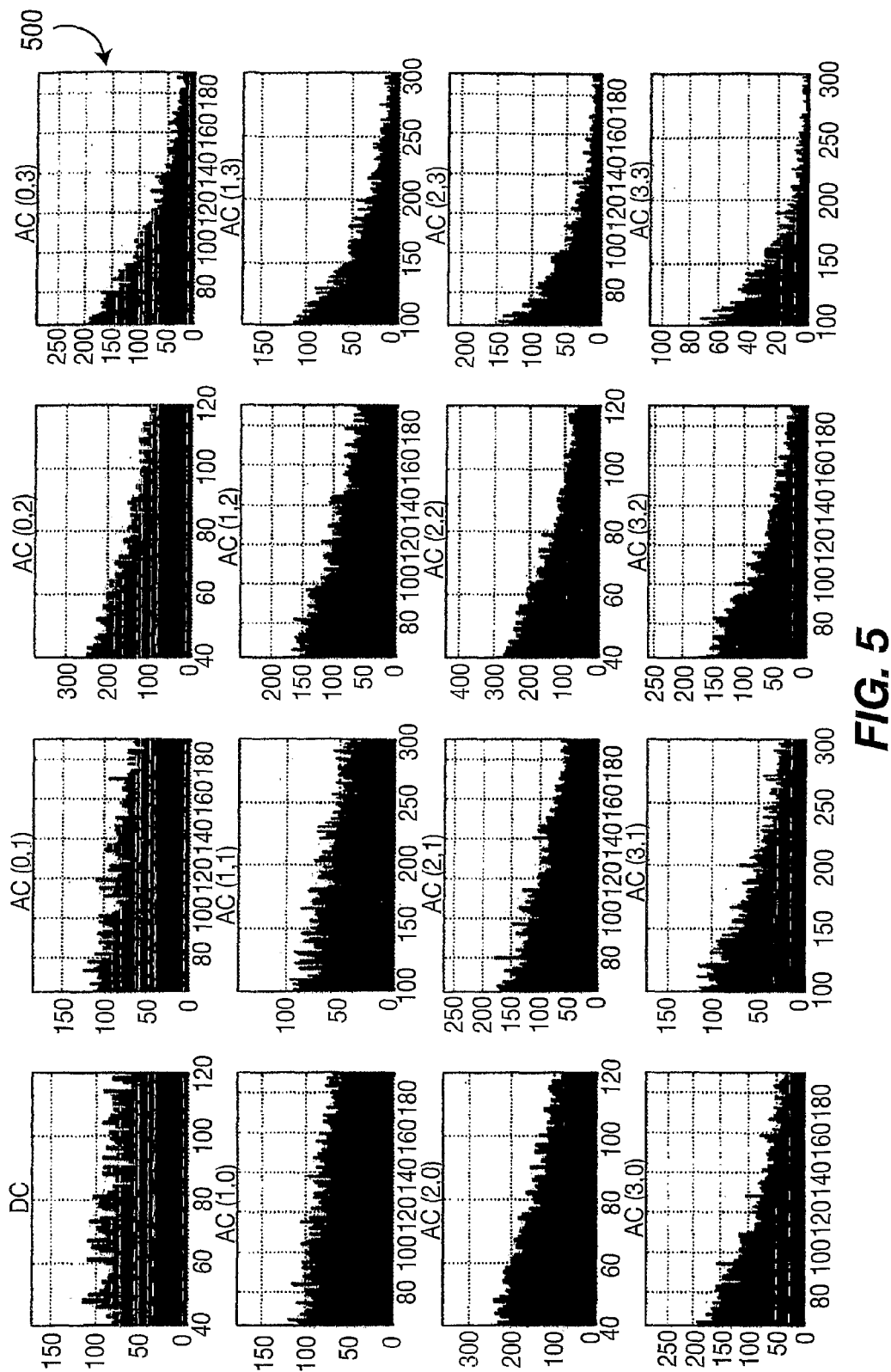
FIG. 5 shows plots for a distribution around level 1 (QP 30)
Figure 6:
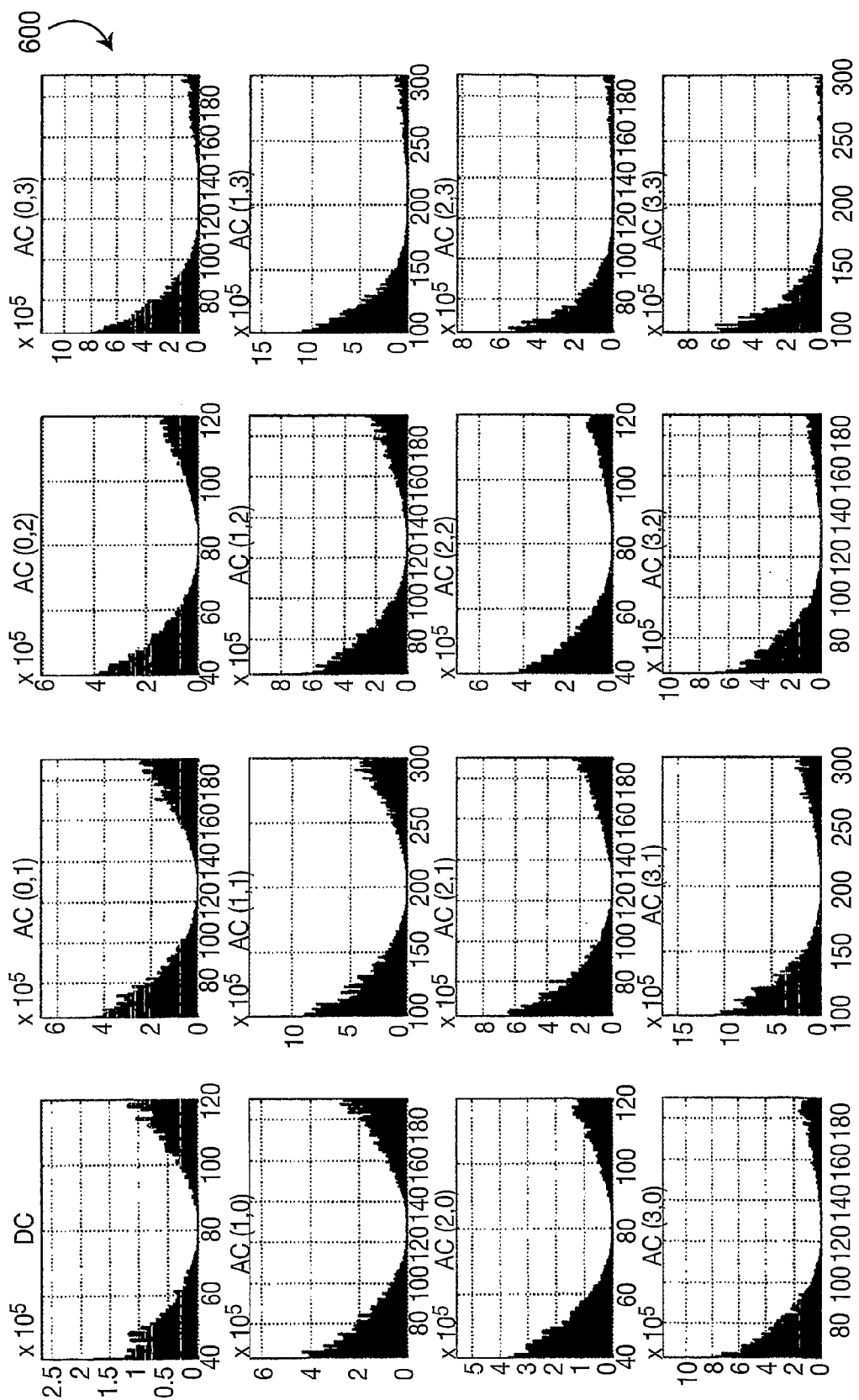
FIG. 6 shows plots for an error contribution around level 1 (QP 30) for the distribution of FIG. 5.
Figure 7:
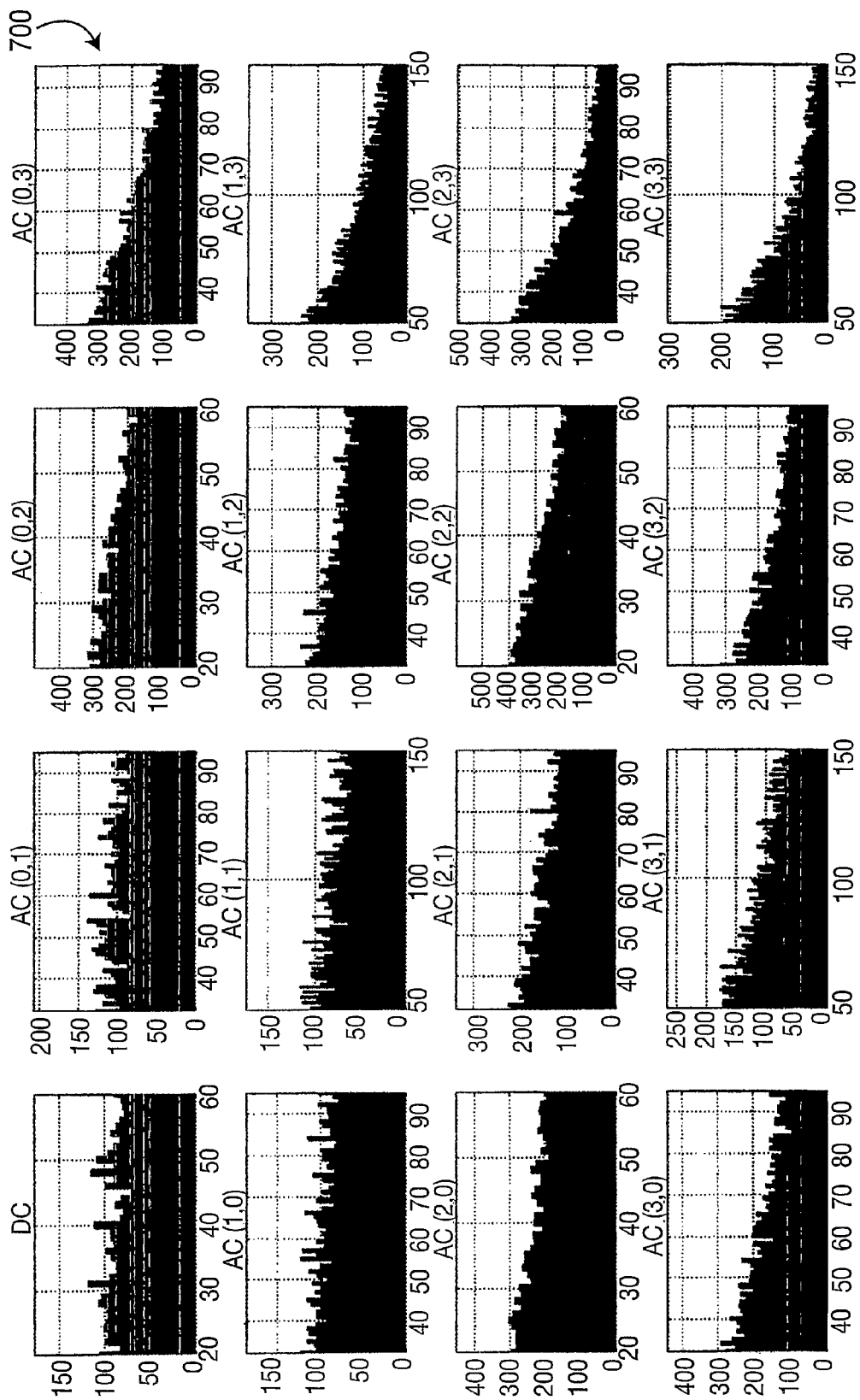
FIG. 7 shows plots for a distribution around level 1 (QP 24)
Figure 8:
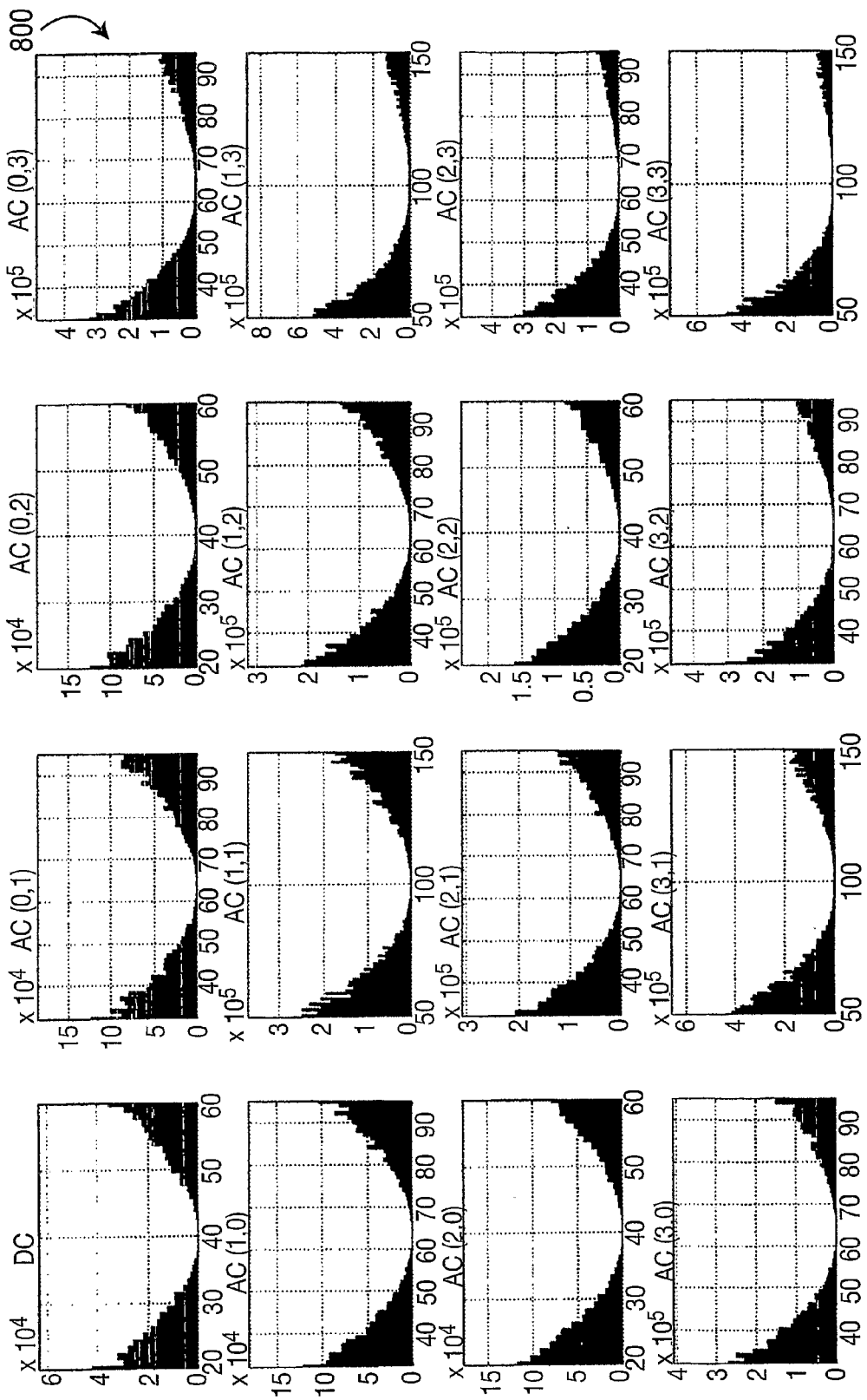
FIG. 8 shows plots for an error contribution around level 1 (QP 24) for the distribution of FIG. 7.
Figure 9:
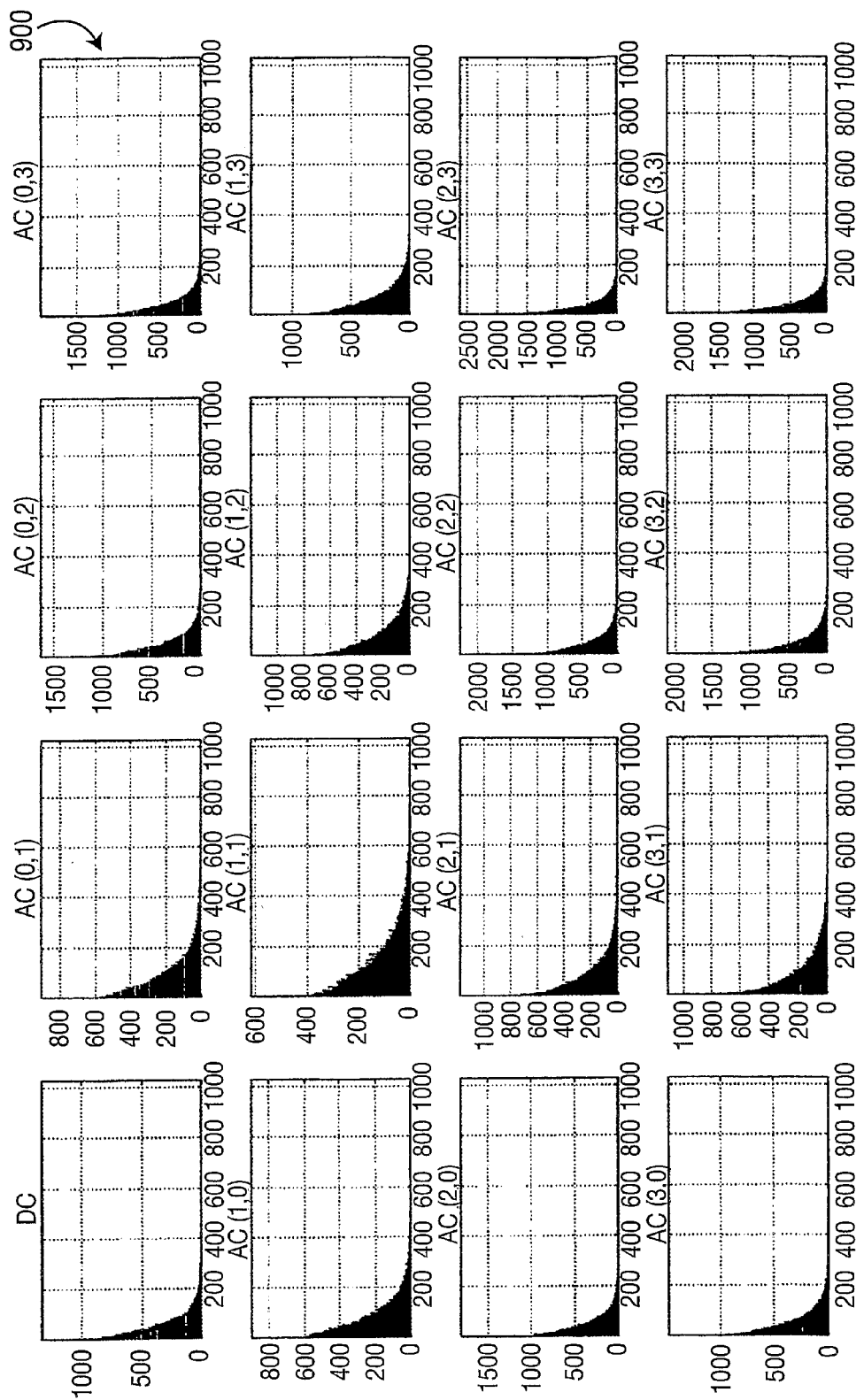
FIG. 9 shows plots for a distribution of transform coefficients for inter coded blocks for a high texture SD sequence.
Figure 10:
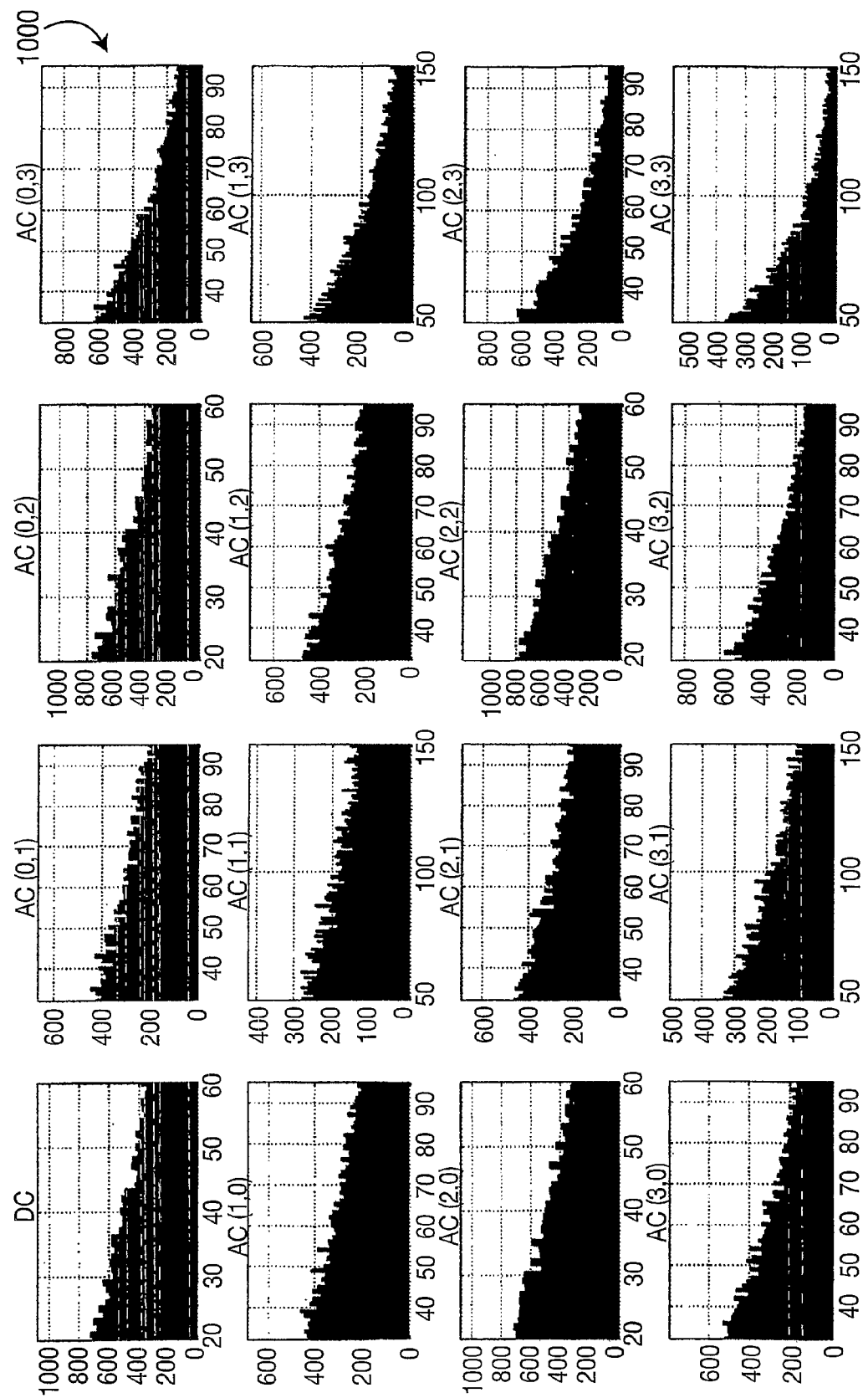
FIG. 10 shows plots for a distribution around inter level 1 (QP 24)
Figure 11:
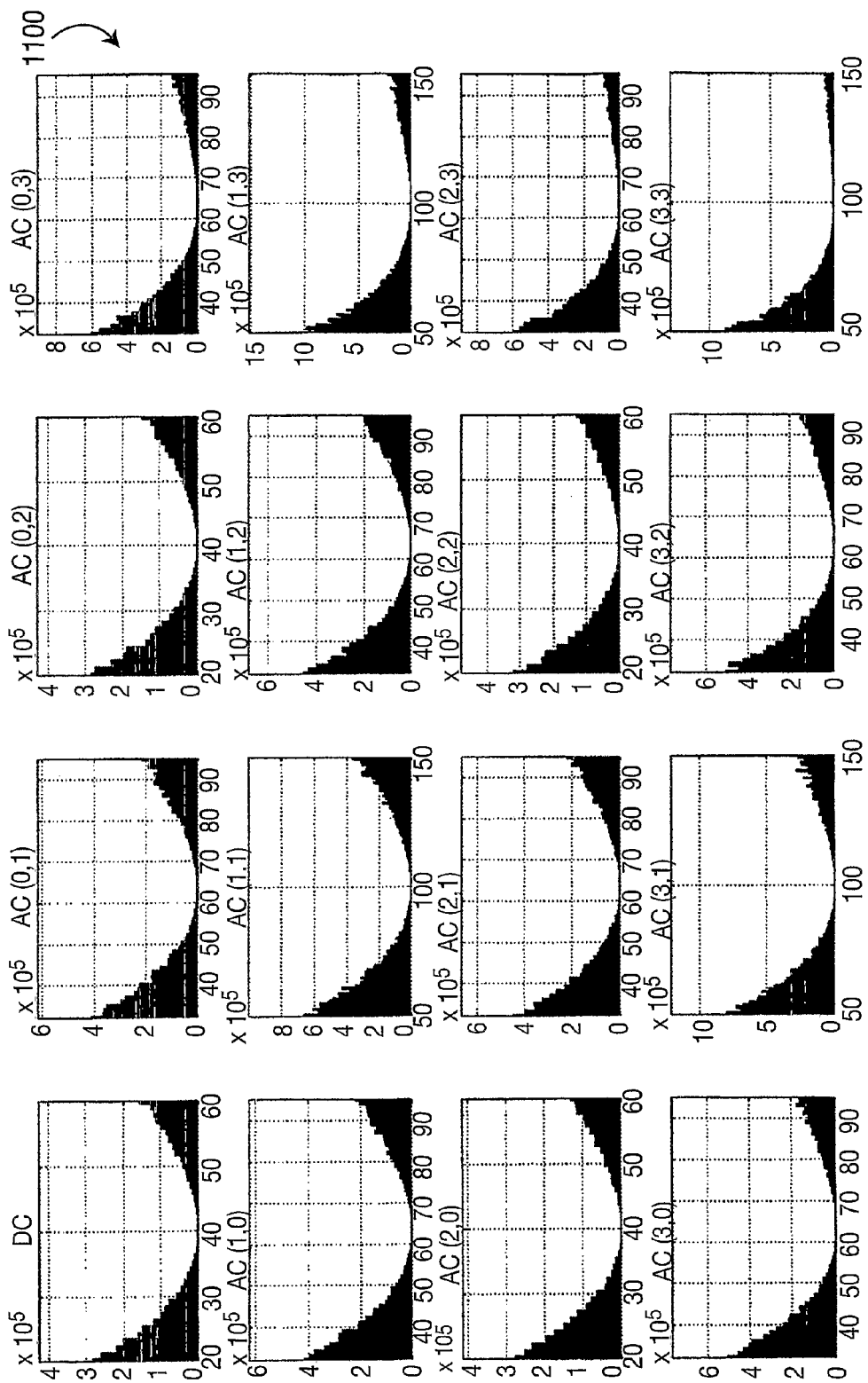
FIG. 11 shows plots for an error contribution around level 1 (QP 24) for the distribution of FIG. 10.
Figure 12:
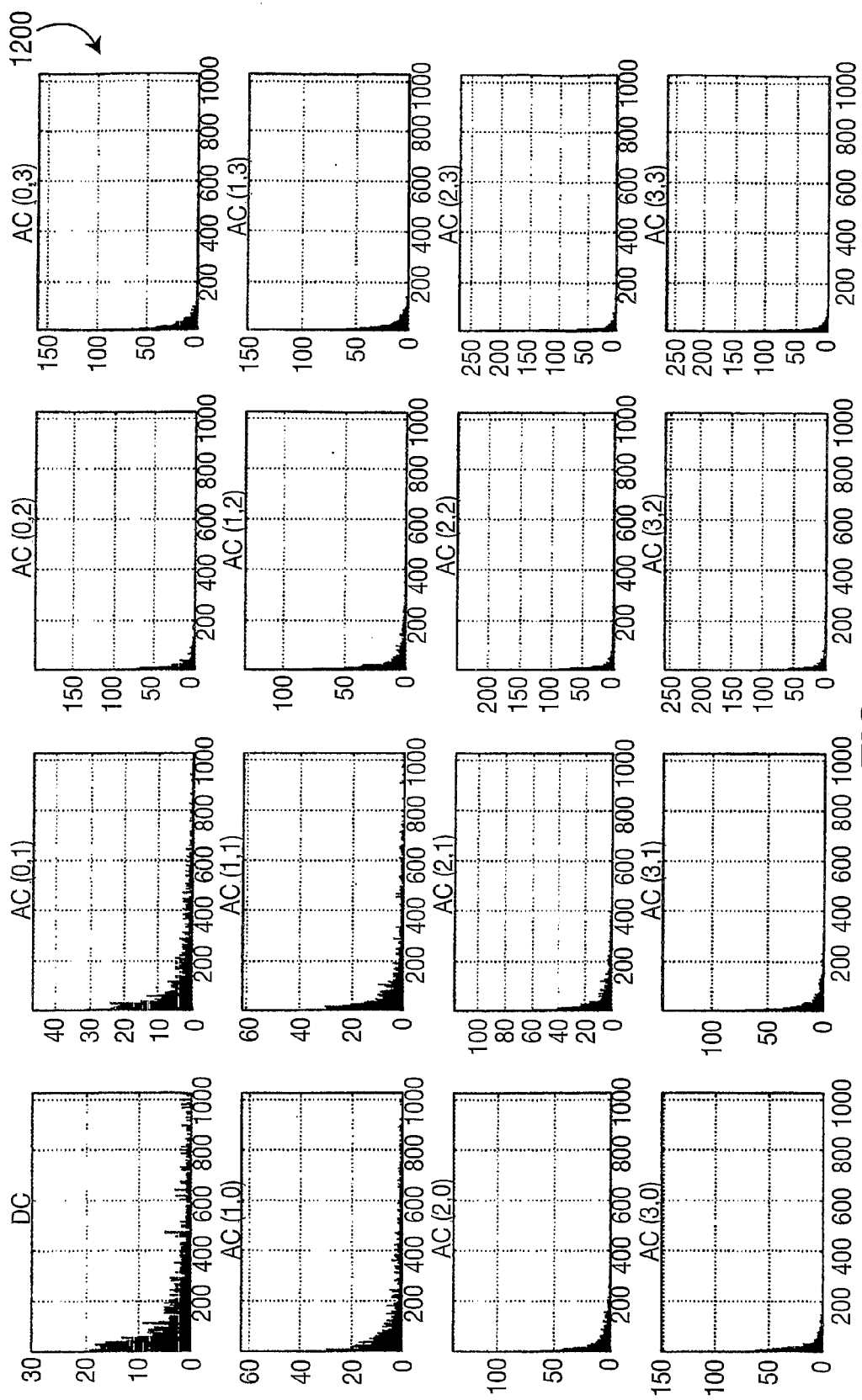
FIG. 12 shows plots for a distribution of transform coefficients for intra coded blocks within a low texture QCIF resolution sequence.
Figure 13:
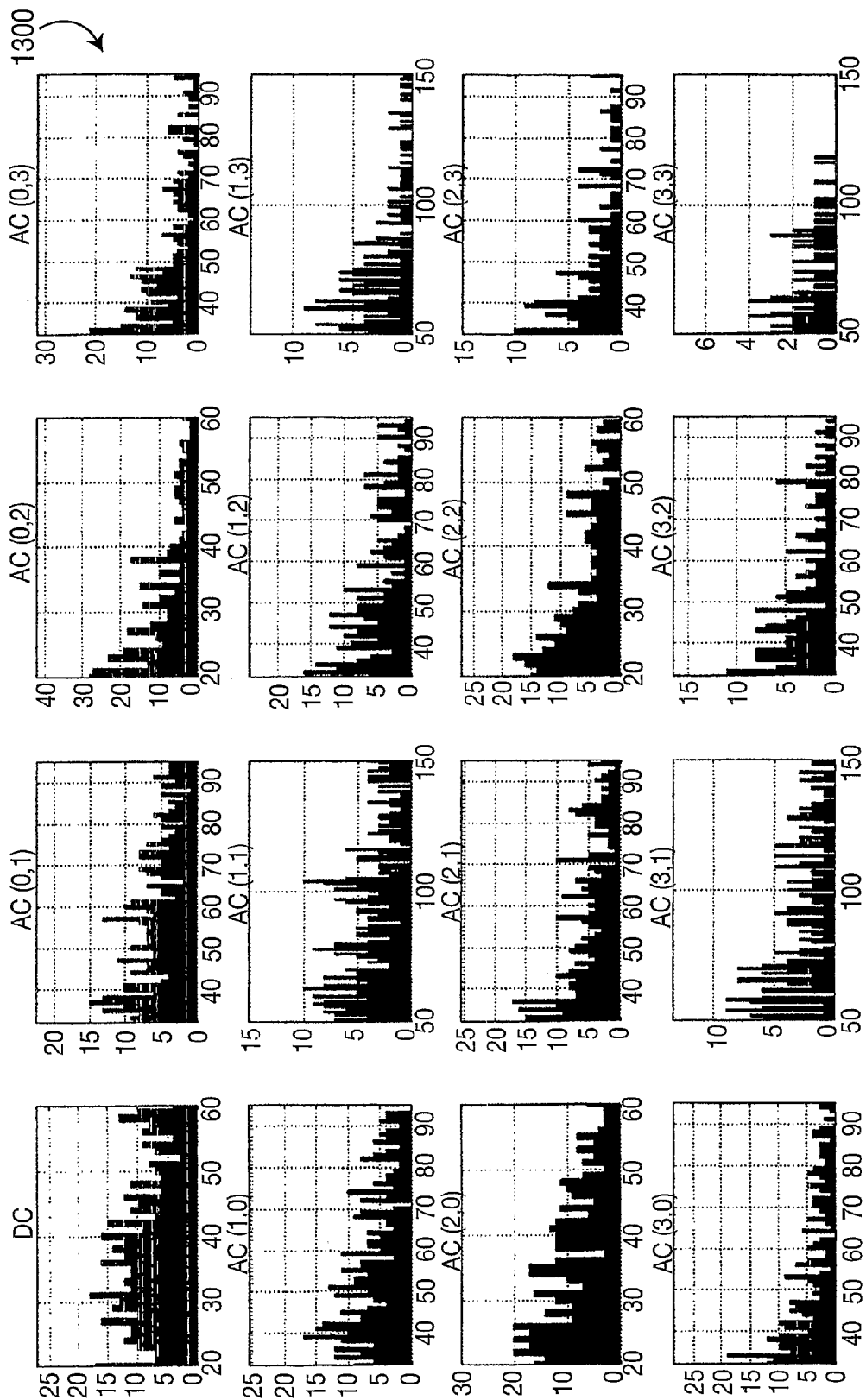
FIG. 13 shows plots for a distribution around intra level 1 (QP 24)
Figure 14:
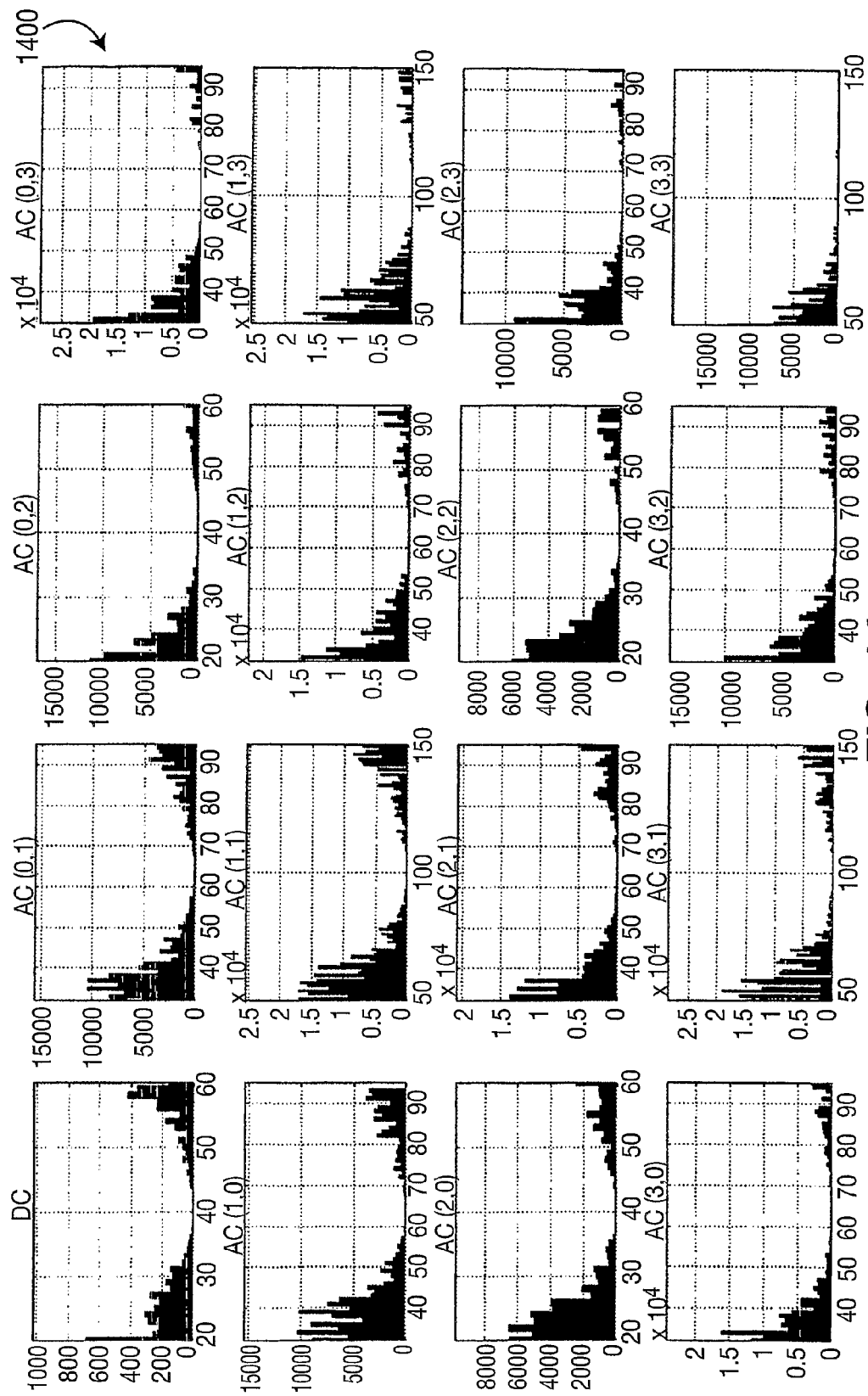
FIG. 14 shows plots for an error contribution around level 1 (QP 24) for the distribution of FIG. 13.
Figure 15:
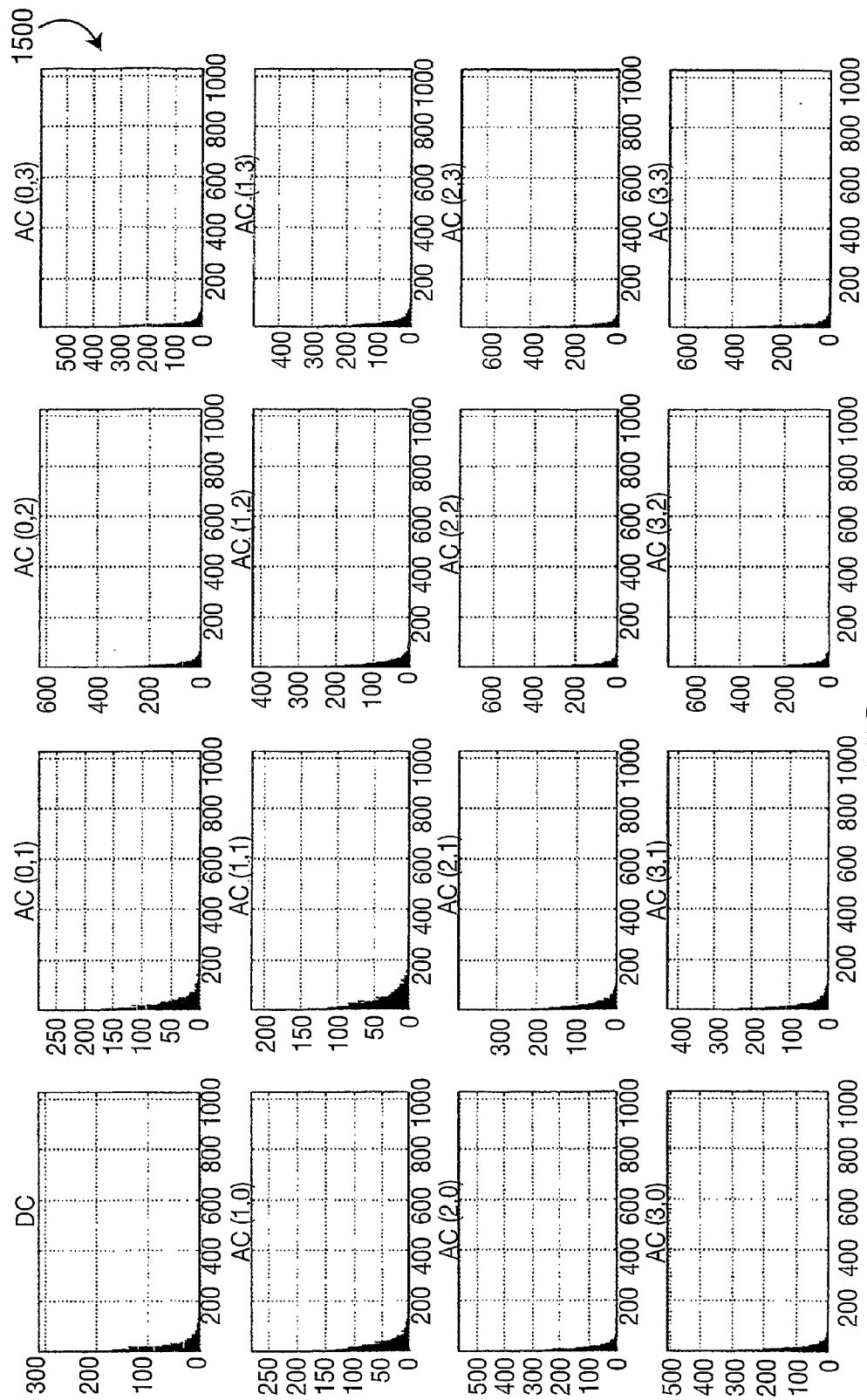
FIG. 15 shows plots for a distribution of transform coefficients for inter coded blocks within a low texture QCIF resolution sequence.
Figure 16A:
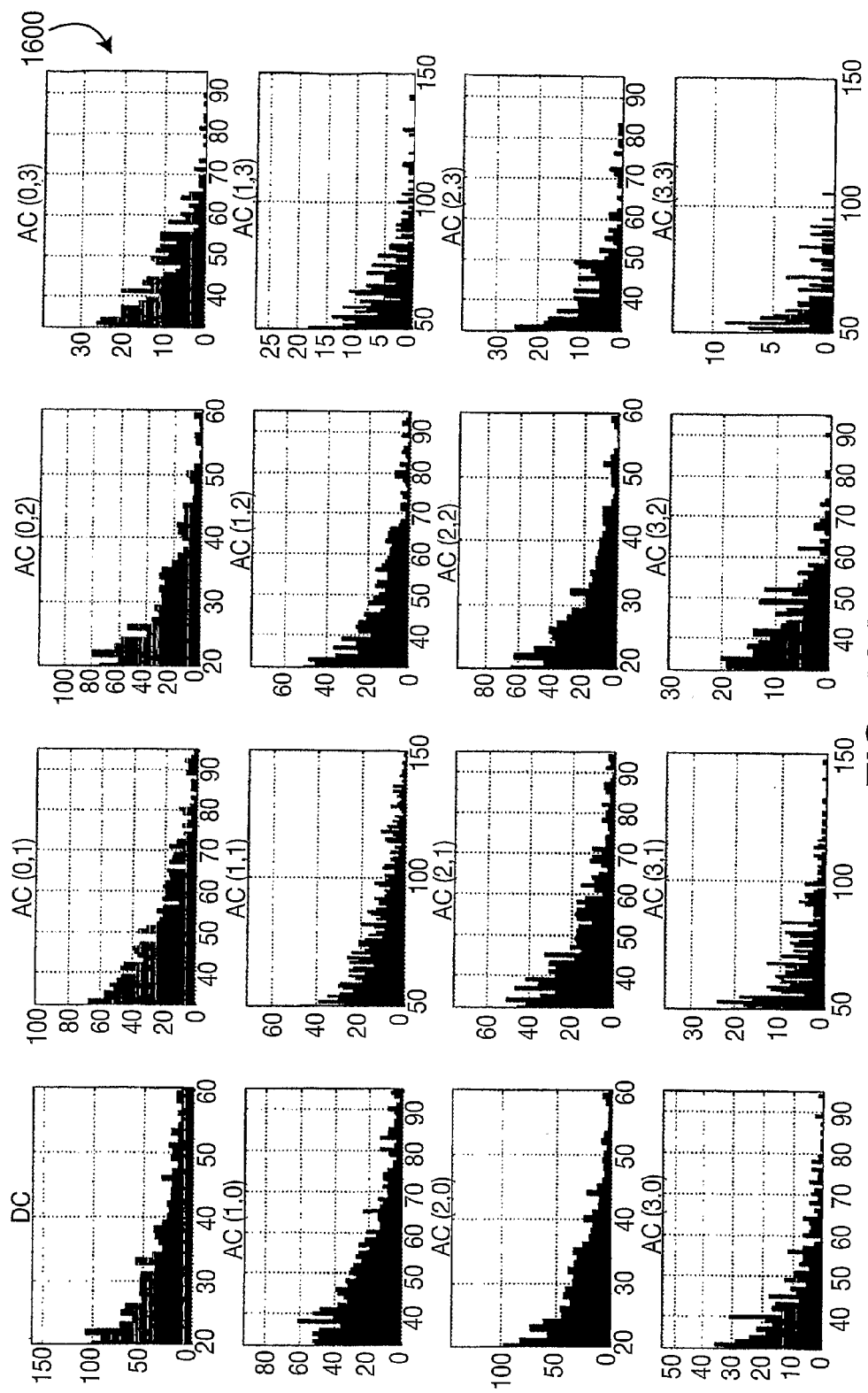
FIG. 16A shows a plot of a distribution around inter level 1 (QP 24)
Figure 16B:
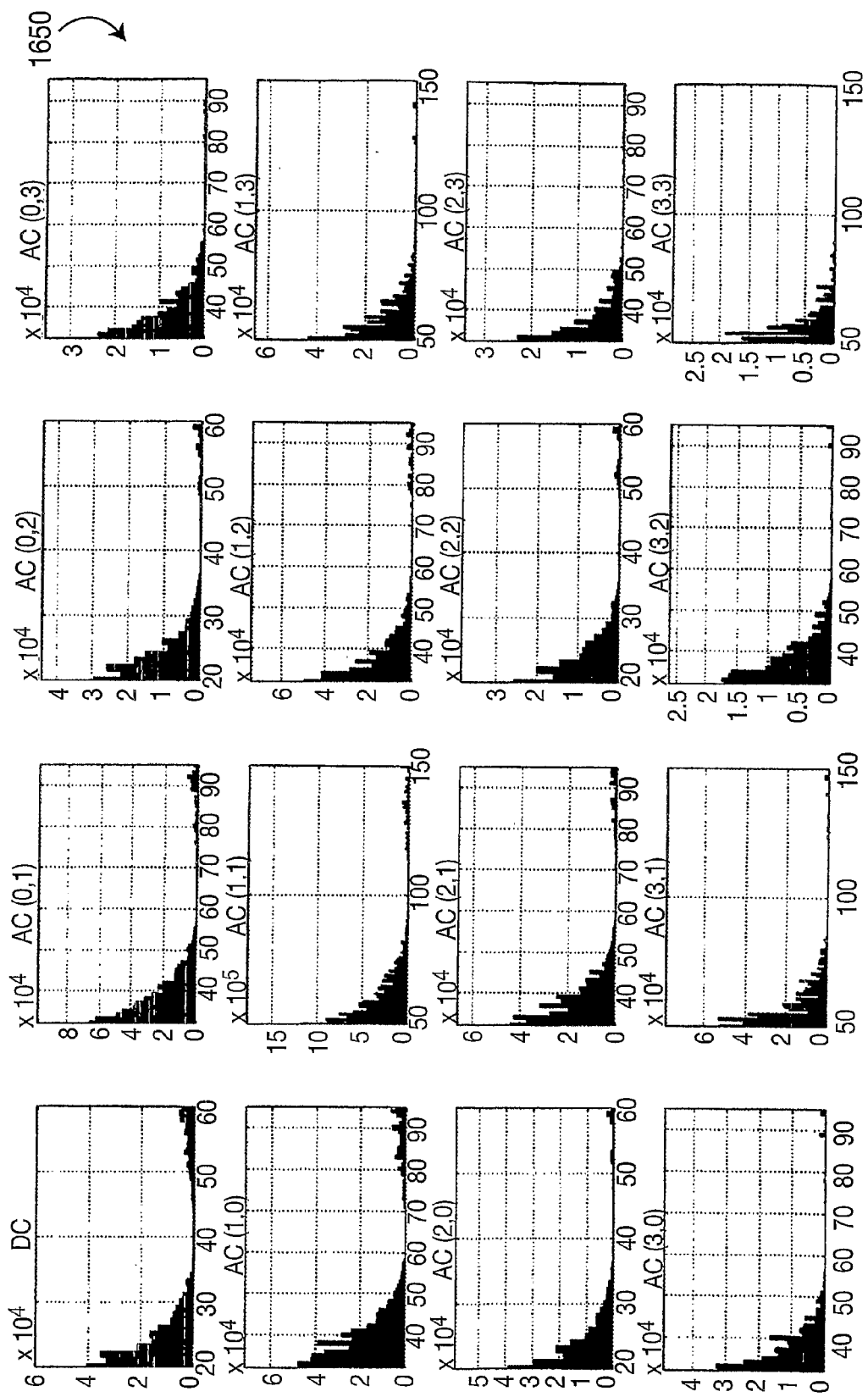
FIG. 16B shows an error contribution around level 1 (QP 24) for the distribution of FIG. 16A.

It can nevertheless be observed (see, e.g., FIGS. 4 through 16B) that this claim is not always true and is highly content and coefficient dependent. In FIG. 4, an intra transform (4×4) coefficient distribution for a high texture SD sequence is indicated generally by the reference numeral 400. In FIG. 5, the intra coefficient distribution around level 1 (QP 30) for this sequence is indicated generally by the reference numeral 500. FIG. 6 shows the error contribution for the above coefficient distribution around level 1 which is indicated generally by the reference numeral 600. However, FIG. 7 illustrates the intra coefficient distribution around level 1 using a smaller quantizer (QP 24) for this sequence, the intra coefficient distribution being indicated generally by the reference numeral 700. Similar to FIG. 6, FIG. 8 shows the error contribution for the above coefficient distribution around level 1 which is indicated generally by the reference numeral 800. In FIG. 9, an inter transform (4×4) coefficient distribution for this high texture SD sequence is indicated generally by the reference numeral 900. For this distribution, FIG. 10 shows the distribution around level 1 (QP 24) which is indicated generally by the reference numeral 1000. Turning to FIG. 11, the error contribution for the above coefficient distribution around level 1 is indicated generally by the reference numeral 1100. In comparison, now turning to FIG. 12, an intra transform (4×4) coefficient distribution for a Low texture QCIF sequence is indicated generally by the reference numeral 1200. In FIG. 13, the intra coefficient distribution around level 1 (QP 24) for this sequence is indicated generally by the reference numeral 1300. FIG. 14 shows the error contribution for the above coefficient distribution around level 1 which is indicated generally by the reference numeral 1400. In FIG. 15, an inter transform (4×4) coefficient distribution for this low texture QCIF sequence is indicated generally by the reference numeral 1500. For this distribution, FIG. 16A shows the distribution around level 1 (QP 24) which is indicated generally by the reference numeral 1600. Turning to FIG. 16B, the error contribution for the above coefficient distribution around level 1 is indicated generally by the reference numeral 1650. Note that in these figures, the appropriate scaling for each transform coefficient was also considered. It can be observed that for the low resolution and detail content, such as the QCIF sequence shown in FIGS. 12 through 16B, although distribution of the coefficients may be closer to Laplacian, there is a significant difference from one coefficient to another. Assuming Laplacian distribution, higher order coefficients tend to decay faster (smaller decay rate $\lambda$ or larger variance) than lower order ones. This immediately suggests that coefficients need to be handled differently according to their order, instead of assuming a similar distribution model across frequencies. This becomes even more obvious for high resolution content and in particular film or highly textured content, which could also contain noise (e.g., film grain noise), and could significantly impact the coefficient distribution (FIGS. 4 through 11). Such noise tends to represent itself as a low to medium variance among samples, which itself impacts the distribution in being closer to Gaussian. Apparently, by using the fixed rounding parameter f as is used by the H.264 reference software, even if such is modified according to frequency, this kind of distribution is not properly accounted for, resulting in a non optimal quantization process. It is actually observed that especially for low to medium quantization parameters (corresponding to very high to medium bitrates) that the piecewise distribution within and near a quantization level (and particularly around level 1) can become in certain cases uniform or close to uniform (FIGS. 5, 7, 10, 13). Under these conditions, the selection of f can be rather critical since an inappropriately large dead-zone could result in more than necessary coefficients being quantized to zero, which could lead to reduced objective, and more significantly subjective quality.

This problem tends to be more critical for H.264 considering that the Baseline, Main, and Extended profiles only allow the use of an integer 4×4 transform. The 4×4 transform, although tends to have some very nice properties such as reduction of blocking and ringing artifacts, bit exact implementation, and so forth, it nevertheless has lower de-correlation properties than an 8×8 transform, while also is more sensitive to quantization decisions. In particular, assuming that it is desired to perform quantization of the following block using a quantizer value (QP) of 26 (f is considered as equal to $\Delta/2$):

$$\begin{bmatrix} -10 & -6 & -7 & -4 \\ -4 & -8 & -4 & -5 \\ 43 & 47 & 42 & 44 \\ 47 & 46 & 43 & 42 \end{bmatrix},$$

then the quantization process would result to the following:

$$\begin{bmatrix} -10 & -6 & -7 & -4 \\ -4 & -8 & -4 & -5 \\ 43 & 47 & 42 & 44 \\ 47 & 46 & 43 & 42 \end{bmatrix} \xrightarrow{\text{Transform/Quant}} \begin{bmatrix} 6 & 0 & 0 & 0 \\ -8 & 0 & 0 & 0 \\ 0 & 0 & 0 & 0 \\ 2 & 0 & 0 & 0 \end{bmatrix} \xrightarrow{\text{IQuant/ITransform}}$$

$$\begin{bmatrix} -8 & -8 & -8 & -8 \\ -4 & -4 & -4 & -4 \\ 44 & 44 & 44 & 44 \\ 48 & 48 & 48 & 48 \end{bmatrix}.$$

It is immediately observed that although the original block is described by high vertical and low horizontal activity and although the QP is not very high, all horizontal activity in the reconstructed block is lost. Although the Mean Square Error (MSE) for this particular block is relatively low (7.625), the subjective impact of this process could be rather severe considering that the perceptual characteristics of this block have been severely altered. More specifically, it is observed that the block after reconstruction tends to be rather structured compared to the original thus making it more noticeable and unpleasant to a viewer.

The above is an immediate consequence of the quantization process, and in particular the assignment of a coefficient to level 0 instead of level 1. If all coefficients either horizontally or vertically are set to zero then the resulting outcome would be as above. Nevertheless, such could be avoided by selectively forcing some coefficients (at least one) in the affected dimension to level one instead of zero. Such a process could be performed in various ways. First of all, it needs to be determined whether such a process is necessary or not. In particular, such a characteristic tends to happen if the column-wise or row-wise variance (i.e., the sum of variances for all rows or columns in a block) is relatively small. Such values can be computed as:

$$\text{column\_sVar} = \sum_{i=0}^{i=3} \left[ \frac{1}{4}\sum_{j=0}^{j=3} x_{i,j}^2 - \left(\frac{1}{4}\sum_{j=0}^{j=3} x_{i,j}\right)^2 \right] \text{ and}$$

$$\text{row\_sVar} = \sum_{j=0}^{j=3} \left[ \frac{1}{4}\sum_{i=0}^{i=3} x_{i,j}^2 - \left(\frac{1}{4}\sum_{i=0}^{i=3} x_{i,j}\right)^2 \right],$$

where $x_{i,j}$ corresponds to the pixel value at row and column i and j respectively. If $T_1<\text{column\_sVar}<T_2$ or $T_3<\text{row\_sVar}<T_4$ are satisfied, then the quantization process could be altered to consider such characteristics. Furthermore, the entire macroblock's or block's variance may be considered as follows:

$$\text{blockVar} = \frac{1}{B_v \times B_h} \sum_{j=0}^{j=B_v-1} \sum_{i=0}^{i=B_h-1} x_{i,j}^2 - \left(\frac{1}{B_v \times B_h} \sum_{j=0}^{j=B_v-1} \sum_{i=0}^{i=B_h-1} x_{i,j}\right)^2,$$

where $B_v$ and $B_h$ are the block height and width respectively. More specifically, different processing can be applied if blockVar corresponds to different value regions, or the values of $T_1$, $T_2$, $T_3$, and $T_4$, could be adapted accordingly (e.g., using a table lookup that depends on blockVar). It is actually recommended that instead of only collecting distribution statistics for the AC coefficients for the entire image, distribution can be additionally collected for regions with different characteristics allowing for more accurate and refined adaptation of the quantization process.

A rather simple method for introducing artificially horizontal or/and vertical variance (as required) within the 4×4 transform is to enforce or increase the probability that AC coefficients at positions (1,0) or/and (0,1) are set to level 1. This can be done by increasing the value of f for those coefficients only if they were originally found to be zero using the original f value. For example, if the above characteristics are satisfied (vertical or horizontal variance), and assuming that it is desired to retain the (1,0) coefficient if possible, then the following process may be performed:

Compute preliminary level $\hat{Z}_{1,0}$ of coefficient $W_{1,0}$ as:

$$\hat{Z}_{1,0} = \text{int}\left(\frac{|W_{1,0}| + f_1}{\Delta}\right) \cdot \text{sgn}(W_{1,0}),$$

where $f_1$ is a preliminary rounding parameter. If $\hat{Z}_{1,0}=0$ and the above conditions are satisfied, then the final level $Z_{1,0}$ is computed as:

$$Z_{1,0} = \text{int}\left(\frac{|W_{1,0}| + f_2}{\Delta}\right) \cdot \text{sgn}(W_{1,0})$$

where $f_2$ ($f_2>f_1$) is selected in a way to increase the priority of this coefficient being mapped at level 1.

This embodiment, although it can improve the subjective quality for certain cases, may hurt subjective quality for others, while also it never considers impact on the objective quality. Another approach is to first perform a preliminary quantization for all coefficients. This would basically result in a transform matrix W and a preliminary quantization matrix $\hat{Z}$ as follows:

$$W = \begin{bmatrix} W_{0,0} & W_{0,1} & W_{0,2} & W_{0,3} \\ W_{1,0} & W_{1,1} & W_{1,2} & W_{1,3} \\ W_{2,0} & W_{2,1} & W_{2,2} & W_{2,3} \\ W_{3,0} & W_{3,1} & W_{3,2} & W_{3,3} \end{bmatrix} \Rightarrow \hat{Z} = \begin{bmatrix} \hat{Z}_{0,0} & \hat{Z}_{0,1} & \hat{Z}_{0,2} & \hat{Z}_{0,3} \\ \hat{Z}_{1,0} & \hat{Z}_{1,1} & \hat{Z}_{1,2} & \hat{Z}_{1,3} \\ \hat{Z}_{2,0} & \hat{Z}_{2,1} & \hat{Z}_{2,2} & \hat{Z}_{2,3} \\ \hat{Z}_{3,0} & \hat{Z}_{3,1} & \hat{Z}_{3,2} & \hat{Z}_{3,3} \end{bmatrix}$$

if for all columns with j>0 the $\hat{Z}_{i,j}$ are zero, or/and all $\hat{Z}_{i,j}$ are zero for i>0, then the coefficient among these $\hat{Z}_{i,j}$ that is the best to be set to level 1 in terms of a provided cost is found. This is a minimization problem where the minimum a function J (similar to Rate distortion optimization techniques) needs to be found such as:

$$J_{i,j} = \text{Distortion}_{i,j} + \lambda \cdot \text{Cost}_{i,j}.$$

Distortion$_{i,j}$ can be set using different distortion metrics such as:

$$\text{Distortion}_{i,j} = (W_{i,j}-\Delta)^2 \text{ or as Distortion}_{i,j} = |W_{i,j}-\Delta|,$$

while Cost$_{i,j}$ could represent the actual bitrate cost for modifying one coefficient, or even be equal to the distance from the last non zero coefficient in terms of scanning order and can be described in a matrix form as follows:

$$Cost = \begin{bmatrix} 0 & c_{0,1} & c_{0,2} & c_{0,3} \\ c_{1,0} & c_{1,1} & c_{1,2} & c_{1,3} \\ c_{2,0} & c_{2,1} & c_{2,2} & c_{2,3} \\ c_{3,0} & c_{3,1} & c_{3,2} & c_{3,3} \end{bmatrix}$$

Note that if both horizontal and vertical coefficients need to be changed (i.e., all coefficients except DC were quantized to zero), then a joint cost from altering either horizontal or vertical coefficients while the other dimension is zero (i.e. coefficients at 0,j or i,0) needs to be considered, while on the other hand, while modifying a single coefficient at a position (i,j) with both i and j larger than zero would have an immediate impact on both dimensions and a single cost could be used.

A similar approach may be followed for transforms larger than 4×4 (i.e. 8×8). For the 8×8 transform for example it might be desirable to retain not only a single horizontal or vertical coefficient, but two of them since that may allow a more realistic reconstruction/representation of the original texture. In such a case, selection of the two (or more) coefficients needs to be again performed jointly (by examining all possible combinations), or for simplicity it may also be tried to first optimize each coefficient separately, while in each step the previous coefficient modification is considered within the cost process. More coefficients could also be retained in similar ways for the 4×4 if necessary. More specifically the process can be performed as follows:

The transform matrix W and a preliminary quantization matrix $\hat{Z}$ are again computed as follows:

$$W = \begin{bmatrix} W_{0,0} & W_{0,1} & W_{0,2} & W_{0,3} \\ W_{1,0} & W_{1,1} & W_{1,2} & W_{1,3} \\ W_{2,0} & W_{2,1} & W_{2,2} & W_{2,3} \\ W_{3,0} & W_{3,1} & W_{3,2} & W_{3,3} \end{bmatrix} \Rightarrow \hat{Z} = \begin{bmatrix} \hat{Z}_{0,0} & \hat{Z}_{0,1} & \hat{Z}_{0,2} & \hat{Z}_{0,3} \\ \hat{Z}_{1,0} & \hat{Z}_{1,1} & \hat{Z}_{1,2} & \hat{Z}_{1,3} \\ \hat{Z}_{2,0} & \hat{Z}_{2,1} & \hat{Z}_{2,2} & \hat{Z}_{2,3} \\ \hat{Z}_{3,0} & \hat{Z}_{3,1} & \hat{Z}_{3,2} & \hat{Z}_{3,3} \end{bmatrix}$$

Based on $\hat{Z}$, the cost matrix for changing a single coefficient from level 0 to level 1 is computed.

$$\hat{Cost} = \begin{bmatrix} 0 & \hat{c}_{0,1} & \hat{c}_{0,2} & \hat{c}_{0,3} \\ \hat{c}_{1,0} & \hat{c}_{1,1} & \hat{c}_{1,2} & \hat{c}_{1,3} \\ \hat{c}_{2,0} & \hat{c}_{2,1} & \hat{c}_{2,2} & \hat{c}_{2,3} \\ \hat{c}_{3,0} & \hat{c}_{3,1} & \hat{c}_{3,2} & \hat{c}_{3,3} \end{bmatrix}$$

The coefficient having the smallest RD based cost:

$$J_{i,j} = \text{Distortion}_{i,j} + \lambda^* \hat{c}_{i,j}$$

is then modified. This will result in a new matrix Z' with:

$$Z'' = \begin{bmatrix} Z'_{0,0} & Z'_{0,1} & Z'_{0,2} & Z'_{0,3} \\ Z'_{1,0} & Z'_{1,1} & Z'_{1,2} & Z'_{1,3} \\ Z'_{2,0} & Z'_{2,1} & Z'_{2,2} & Z'_{2,3} \\ Z'_{3,0} & Z'_{3,1} & Z'_{3,2} & Z'_{3,3} \end{bmatrix}$$

The second coefficient that is to be modified is again selected using a criterion such as $J_{i,j} = \text{Distortion}_{i,j} + \lambda^* \text{Cost}_{i,j}$ where now $\text{Cost}_{i,j}$ is computed based on the new level matrix Z'. This process can be repeated as necessary depending on the number of additional coefficients necessary to be retained.

Although the subjective quality can somewhat improve for certain cases using the above methods, an alternative method may nevertheless be employed that can improve both subjective and objective quality by better selecting $f_2$ based on the coefficient distribution and through minimizing the generated distortion. As before, the preliminary level $\hat{Z}_{1,0}$ of coefficient $W_{1,0}$ is again computed as follows:

$$\hat{Z}_{1,0} = \text{int}\left(\frac{|W_{1,0}| + f_1}{\Delta}\right) \cdot \text{sgn}(W_{1,0}),$$

where $f_1$ is a preliminary rounding parameter.

If $\hat{Z}_{1,0} = 0$ and the above conditions are satisfied, then the final level $Z_{1,0}$ is computed as $$Z_{1,0} = \text{int}\left(\frac{|W_{1,0}| + f_2}{\Delta}\right) \cdot \text{sgn}(W_{1,0})$$

where $f_2$ ($f_2 > f_1$) is selected in a way to increase the priority of this coefficient being mapped at level 1. Now $f_2$ can be computed by examining the distribution of the coefficients. Such a distribution could be collected by performing a pre-analysis of the current data, or by assuming that the current distribution would have similar properties as the distribution as previously coded blocks (in the current or previous pictures) of the same type. Assuming that the preliminary level is $\hat{Z}$, the distribution area around this level can be computed. This can be done by either considering the exact statistics of the distribution, or through using the model-based methods (e.g. usage of the Laplacian or Gaussian distribution models). The usual method for determining the optimal quantization point for a given distribution region can be selected as approximately the median point of the distribution (i.e., the point that separates the distribution into two equal sized areas $A_{Z^+} \approx A_{Z^-}$). It should be noted that this median point is an approximation, by assuming that the piecewise distribution is almost piecewise linear. A more accurate strategy is to use the Lloyd Max method and find the point that minimizes error. By making the piecewise linear distribution, properties from a right trapezoid (i.e., a trapezoid with two right angles) can be used, which can be seen in FIG. 17, to compute $f_2$:

$$A_{Z^-} = f \cdot \frac{(h_1 + H_2)}{2} \text{ and}$$

$$A_{Z^+} = (\Delta - f) \cdot \frac{(h_2 + H_2)}{2} \Rightarrow f \cdot \frac{(h_1 + H_2)}{2} =$$

$$(\Delta - f) \cdot \frac{(h_2 + H_2)}{2} \Rightarrow f \cdot (h_1 + H_2) + f(h_2 + H_2) - \Delta(h_2 + H_2) =$$

$$0 \Rightarrow f \cdot (h_1 + h_2 + 2H_2) - \Delta(h_2 + H_2) = 0$$

Figure 17:
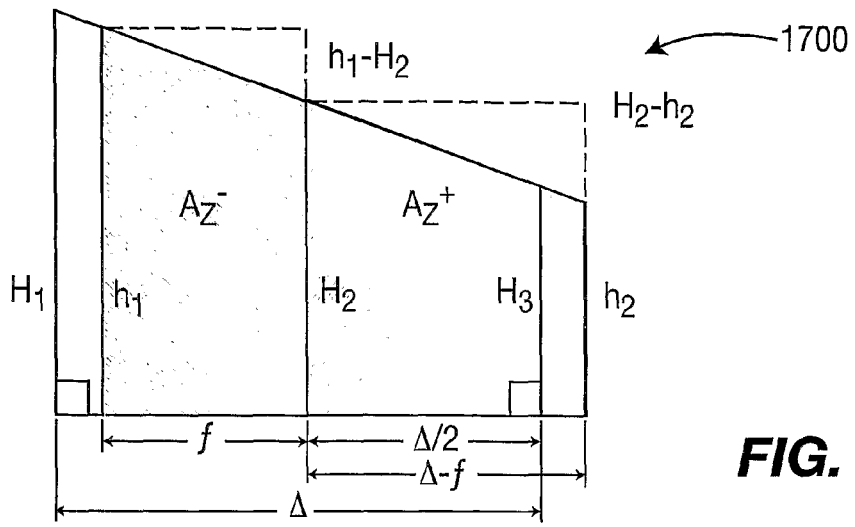
FIG. 17 shows a diagram for the computation of f using right trapezoids.

Turning to FIG. 17, the computation of f using right trapezoids is indicated generally by the reference numeral 1700.

We also have:

$$\frac{h_1 - H_2}{f} = \frac{2(H_1 - H_2)}{\Delta} = \frac{H_2 - h_2}{\Delta - f} \Rightarrow$$

$$h_1 = \frac{2f(H_1 - H_2)}{\Delta} + H_2 \text{ and,}$$

$$h_2 = (f - \Delta)\frac{2(H_1 - H_2)}{\Delta} + H_2 \Rightarrow$$

$$f \cdot \left(\frac{2f(H_1 - H_2)}{\Delta} + (f - \Delta)\frac{2(H_1 - H_2)}{\Delta} + 4H_2\right) -$$

$$\Delta\left((f - \Delta)\frac{2(H_1 - H_2)}{\Delta} + 2H_2\right) = 0 \Rightarrow$$

$$f \cdot \left(\frac{4f(H_1 - H_2)}{\Delta} - 2(H_1 - H_2) + 4H_2\right) -$$

$$\Delta\left(\frac{2f(H_1 - H_2)}{\Delta} - 2(H_1 - H_2) + 2H_2\right) = 0 \Rightarrow$$

$$\frac{4f^2(H_1 - H_2)}{\Delta} + (6H_2 - 2H_1)f - 2f(H_1 - H_2) +$$

$$\Delta 2(2H_2 - H_1) = 0 \Rightarrow$$

$$\frac{4f^2(H_1 - H_2)}{\Delta} + (8H_2 - 4H_1)f + \Delta(4H_2 - 2H_1) = 0 \Rightarrow$$

$$f = \Delta\frac{-(8H_2 - 4H_1) \pm \sqrt{(8H_2 - 4H_1)^2 - 32(H_1 - H_2)(2H_2 - H_1)}}{(8(H_1 - H_2))} \Rightarrow$$

$$f = \Delta\frac{(H_1 - 2H_2) \pm \sqrt{4H_2^2 - 4H_2H_1 + H_1^2 - 2H_2H_1 + 2H_1^2 + 4H_2^2 - 2H_2H_1}}{(2(H_1 - H_2))} \Rightarrow$$

$$f = \Delta\frac{(H_1 - 2H_2) \pm \sqrt{8H_2^2 - 8H_2H_1 + 3H_1^2}}{2(H_1 - H_2)}$$

Note that f and the value within the square root need to be both positive.

Other arithmetic integral methods, such as the Simpson or ⅜ methods, could be used instead of the trapezoid one, although those are slightly more complicated. However, a simpler, although less precise, strategy, is to first compute the areas $A_{\hat{Z}^-}$ and $A_{\hat{Z}^+}$ from $$\left[\hat{Z}\Delta - \frac{x^-}{2}, \hat{Z}\Delta\right)$$

and $$\left[\hat{Z}\Delta, \hat{Z}\Delta + \frac{x^+}{2}\right)$$

respectively by first setting $x^- = x^+ = \Delta$. Then $$f_2 = \frac{A_{\hat{Z}^+}}{2A_{\hat{Z}^-}}\Delta$$

is selected which, although not optimal, is a good enough solution. Note that $x^- = 2 \times f_2$ while $x^+ = 2 \times (1 - f_2)$. This method may also be combined with the previously described method of subjectively optimizing coefficients, where though now the $\hat{Z}$ z in that process is computed based on the new $f_2$ value.

The above method nevertheless does not carefully consider the distortion incurred by each quantized value. The area computation is made with approximately an equal assumption of the distortion incurred. Instead a more appropriate method would be to consider the actual distortion within such computation. That is, areas $A_{\hat{Z}^-}$ and $A_{\hat{Z}^+}$ should be better computed as:

$$A_{\hat{Z}^-} = \sum_{x=\Delta\times\hat{Z}-f}^{x=\Delta\times\hat{Z}-1} \text{distortion}(\Delta \times \hat{Z}, x) \times \text{frequency}(x) \text{ and,}$$

$$A_{\hat{Z}^+} = \sum_{x=\Delta\times\hat{Z}}^{x=\Delta\times\hat{Z}+\Delta-f} \text{distortion}(\Delta \times \hat{Z}, x) \times \text{frequency}(x)$$

where distortion($\Delta\times\hat{Z}$,x) can be a distortion metric between the reconstructed value $\Delta\times\hat{Z}$ and x, such as square difference, i.e. $(\Delta\times\hat{Z}-x)^2$, or absolute difference, i.e., $|\Delta\times\hat{Z}-x|$. frequency (x) corresponds to the number of coefficients which value equal to x. Again our goal is to make $A_{\hat{Z}^+} \approx A_{\hat{Z}^-}$. A simple method to achieve such a property would be to first compute $A_{\hat{Z}^-}$ and $A_{\hat{Z}^+}$ using $$f = \frac{\Delta}{2},$$

and by slowly reducing f find the first position where such a condition or a condition of the form $A_{\hat{Z}^+} \geq A_{\hat{Z}^-}$ is satisfied. A simple algorithm to perform this process can be as follows:

Step 1: Set $f = \frac{\Delta}{2}$. Compute $A_{\hat{Z}^-} = \sum_{x=\Delta\times\hat{Z}-f}^{x=\Delta\times\hat{Z}-1} \text{distortion}(\Delta \times \hat{Z}, x) \times$ frequency(x) and $A_{\hat{Z}^+} = \sum_{x=\Delta\times\hat{Z}}^{x=\Delta\times\hat{Z}+\Delta-f} \text{distortion}(\Delta \times \hat{Z}, x) \times$ frequency(x)

Step 2: If $A_{\hat{Z}^+} \geq A_{\hat{Z}^-}$ end process.

Step 3: Set $f = f - 1$. If $f = 0$, set $f = 1$ and end process.

Step 4: Set $A_{\hat{Z}^-} = A_{\hat{Z}^-} - \text{distortion}(\Delta \times \hat{Z}, \Delta \times \hat{Z} - f) \times$ frequency$(\Delta \times \hat{Z} - f)$ and $A_{\hat{Z}^+} = A_{\hat{Z}^+} +$ distortion$(\Delta \times \hat{Z}, \Delta \times \hat{Z} + \Delta - f) \times$ frequency$(\Delta \times \hat{Z} + \Delta f)$. Goto Step 2.

Although the above methods can improve performance (either objective, subjective, or both) the method of artificially introducing higher levels might not always be desirable since it will not also accurately match the original signal. For this purpose, the prior art introduced a Θ parameter that can be transmitted within the bitstream at certain intervals (i.e., every slice) and that basically introduces a translation (shift) of the reconstruction values of all coefficients (see FIG. 3). Turning to FIG. 3, an impact of Θ=Δ/4 within a quantization process is indicated generally by the reference numeral 300. It is presumed with respect to FIG. 3 that f=Δ/4. This is similar to the present invention where certain coefficients are selectively adjusted from zero level to level one. It though differs from the present invention because in the prior art a change is required to the codec standard so that the decoder is aware of such an adjustment and can reconstruct the coefficients more accurately, which is not necessary in the present invention. The method proposed in the prior art does not consider that the AC coefficients (including the DC coefficient) tend to have rather different distributions. Instead a better approach would be to design a matrix Θ that is transmitted with the bitstream, which would allow a finer refinement for each different coefficient. This approach is very similar to the prior art consideration of quantization matrices within H.264 and other codecs. In the H.264 FRExt specification currently 12 different quantization weighting matrices are allowed, which are basically divided according to transform size (4×4 vs 8×8), color components (Y, U, and V), and prediction type (intra vs. inter), since these are the basic components that can contain rather different distribution characteristics. Similarly, 12 different quantization offsetting matrices can now be defined which, instead of scaling, shift the reconstruction levels. It may be desirable to add additional matrices which need to only be available for Macroblock Adaptive Frame-Field coding, and which will distinguish between field and frame macroblocks. Nevertheless, although all reconstruction values may be shifted, it is observed that the most important one is the one related to level 1. This suggests that it might be better in terms of RD performance to only consider a Θ parameter if the level that is to be reconstructed is level 1. In particular in the prior art it was mentioned that the reconstructed value $W_{ij}'$ can be computed as:

$$W_{ij}' = Z_{ij} \cdot V_{ij} \cdot 2^{floor\left(\frac{QP}{6}\right)} - \Theta \cdot V_{ij} \cdot 2^{-15} \cdot \text{sgn}(Z_{ij})$$

where the $V_{ij}$ parameters originate from the inverse transform process and are related to the quantizer value QP. In our case, $W_{ij}'$ may now be computed considering also that now Θ depends on coefficient position as follows:

if $abs(Z_{ij}) = 1$ $$W_{ij}' = Z_{ij} \cdot V_{ij} \cdot 2^{floor\left(\frac{QP}{6}\right)} - \Theta_{ij} \cdot V_{ij} \cdot 2^{-15} \cdot \text{sgn}(Z_{ij})$$

else $$W_{ij}' = Z_{ij} \cdot V_{ij} \cdot 2^{floor\left(\frac{QP}{6}\right)}$$

Another alternative would be to modify Θ according to the level as follows:

$$W_{ij}' = Z_{ij} \cdot V_{ij} \cdot 2^{floor\left(\frac{QP}{6}\right)} - g(\Theta_{ij}, Z_{ij}) \cdot V_{ij} \cdot 2^{-15} \cdot \text{sgn}(Z_{ij})$$

For example, $g(\Theta_{ij}, Z_{ij}) = \Theta_{ij} >> (Z_{ij} - 1)$ may be used.

Figure 18:
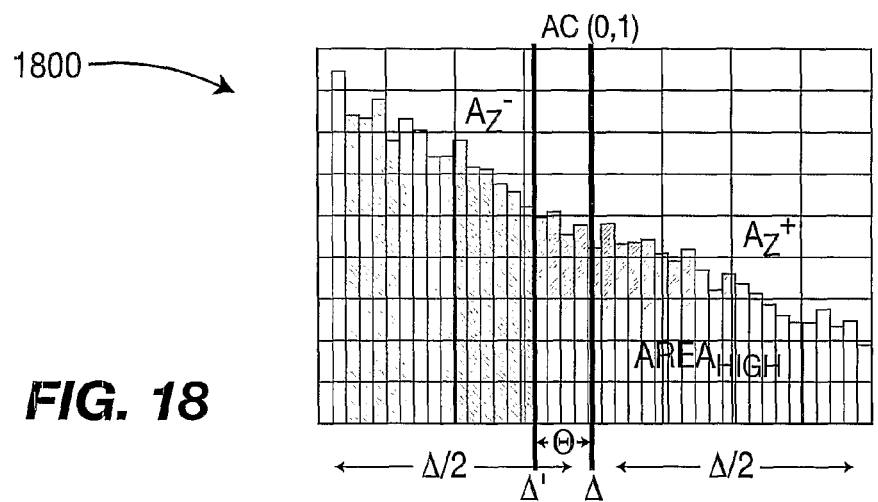
FIG. 18 shows a plot for the selection of $\Theta$ through median selection (area equalization)
Figure 19:
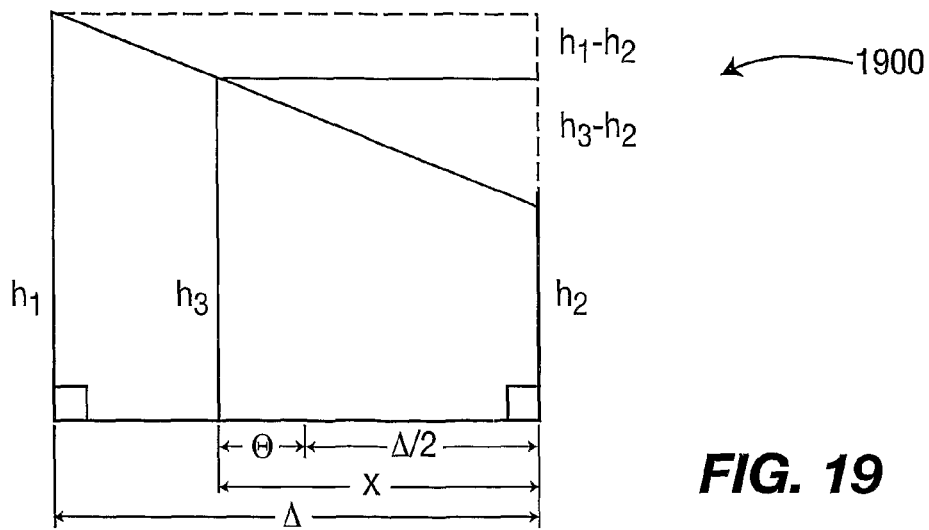
FIG. 19 shows a diagram for the computation of $\Theta$ using right trapezoids.

To compute Θ, a similar approach may be used as for the computation of $f_2$. The idea here is to find the position within a quantization interval Δ corresponding to the median value in terms of distribution, or basically leads to dividing Δ into two equal area regions (see FIG. 18). Turning to FIG. 18, a plot for the selection of Θ through median selection (area equalization) is indicated generally by the reference numeral 1800. This can be done either manually (i.e., computing the full area, and then finding the point which divides the area in half), through the consideration of the model distribution and by performing integral computations, or through the consideration of simple arithmetic methods. In particular, it is observed again from FIG. 18 that our piecewise distribution resembles again to a right trapezoid as can be seen from FIG. 19. Turning to FIG. 19, a diagram for the computation of Θ using right trapezoids is indicated generally by the reference numeral 1900. The full area can then be computed as:

$$A = \frac{\Delta}{2} \cdot (h_1 + h_2)$$

A point $x = \Delta/2 + \Theta$ is to be found such as the area is divided into two equal area regions $\Delta/2$, that is $$\frac{x}{2} \cdot (h_3 + h_2) = \frac{A}{2}.$$

$h_3$ nevertheless, due to similar triangles properties, is also equal to $$h_3 = h_2 + \frac{x \cdot (h_1 - h_2)}{\Delta},$$

thus replacing $h_3$ in the above equation results ⇒

$$x \cdot \left[2h_2 + x \cdot \frac{(h_1 - h_2)}{\Delta}\right] - A = 0 \Rightarrow$$

$$(h_1 - h_2)x^2 + 2\Delta h_2 x - A\Delta = 0 \Rightarrow$$

$$x = \frac{-2\Delta h_2 \pm \sqrt{4\Delta^2 h_2^2 + 4A\Delta(h_1 - h_2)}}{2(h_1 - h_2)} \Rightarrow \Theta$$

$$= \frac{-2\Delta h_2 \pm \sqrt{4\Delta^2 h_2^2 + 4A\Delta(h_1 - h_2)}}{2(h_1 - h_2)} - \frac{\Delta}{2}$$

Since the negative sign makes little sense, what is then had is:

$$\Theta = \frac{-2\Delta h_2 + \sqrt{4\Delta^2 h_2^2 + 4A\Delta(h_1 - h_2)}}{2(h_1 - h_2)} - \frac{\Delta}{2}.$$

Replacing also A, the following is obtained:

$$\Theta = \frac{-2\Delta h_2 + \sqrt{4\Delta^2 h_2^2 + 2\Delta^2(h_1^2 - h_2^2)}}{2(h_1 - h_2)} - \frac{\Delta}{2}$$

$$= \frac{-2\Delta h_2 + \Delta\sqrt{2h_2^2 + 2h_1^2}}{2(h_1 - h_2)} - \frac{\Delta}{2}$$

Θ could also be computed by considering the actual distortion and coefficient frequency similar to what was done for the computation of f. Here though, instead of varying f, the first reconstructed value needs to be varied. That is, the intent is to find a reconstruction value $\hat{\Delta} = \Delta - \Theta$ such that $A_{Z'}(\hat{\Delta},$ $f_0) \approx A_Z\cdot(\hat{\Delta}, f_0)$. Again this can be done using a similar strategy as with f as follows:

Step 1: Set $f = \frac{\Delta}{2}, \Theta = 0$.

Step 2: Compute $A_{Z^-} = \sum_{x=\Delta-f}^{x=\Delta-\Theta-1}$ distortion $(\Delta - \Theta, x) \times$ frequency$(x)$ and $A_{Z^+} = \sum_{x=\Delta-\Theta}^{x=2\Delta-f}$ distortion $(\Delta - \Theta, x) \times$ frequency$(x)$ Step 3: If $A_{Z^+} \geq A_{Z^-}$ end process.

Step 3: Set $\Theta = \Theta + 1$. If $\Theta = \frac{\Delta}{2}$ end process.

Step 4: Goto Step 2.

To further improve performance and the computation of the $\Theta$ values, the number of coefficients set to zero may also be considered. In particular, it may be desirable to limit the percentage of a certain AC coefficient, i.e., the AC coefficient at position (i,j), that is forced to zero. Percentage could be computed at a set of macroblocks, slice, picture, GOP, or even sequence level. Such a decision could be made implicitly by providing a predefined percentage value at the encoder, or automatically by considering certain statistics of the sequence such as variance or distortion if a value is set to zero. If the distribution, suggests that using the current distribution model this percentage is exceeded considerably, then it would be best to further increase the value of $\Theta$ to improve quality. A simple way of considering this property is to find the coefficient value that satisfies this percentage relationship for the zero level, and increase the $\Delta$ value used in the above $\Theta$ computation accordingly. For example, assuming that the zero satisfies a percentage X % at position y (y<$\Delta$/2), then a new $\Delta'$ is used equal to $$\Delta' = \Delta + \left(\frac{\Delta}{2} - y\right)$$

and compute $\Theta$ as:

$$\Theta = \frac{-2\Delta' h_2 + \sqrt{4(\Delta')^2 h_2^2 + 4A\Delta'(h_1 - h_2)}}{2(h_1 - h_2)} - \frac{\Delta'}{2}.$$

$\Theta$ could also be constrained such as $a \leq \Theta < b$ if necessary (for example a can be set to 0 and b=$\Delta$/2). Note that the right trapezoid area computation could also be used to perform an approximation of the $A_{Z^-}$ and $A_{Z^+}$ areas needed for computing $f_2$, without having to perform a full integration of the distribution within these areas. In general, the trapezoidal approximation may be used with any interval for computing these areas.

Finally the distribution could also be used for the computation of the quantization weighting matrices. Assuming that the weight coefficients are already known based on perceptual analysis, weighting coefficients can be also scaled by trying to equalize the distribution for all coefficients. This could be performed by considering the following: (a) the maximum value of each coefficient and computing its ratio compared to a given value (e.g. compared to the DC); (b) the maximum available value for each coefficient within a specified percentage (e.g. 95%) of the distribution starting from zero; and (c) the maximum available value for each coefficient within a specified distinct percentage $P_{i,j}$ of the distribution starting from zero.

Although the distribution of all coefficients could be considered, it is usually better to determine which regions are considered more important in terms of subjective quality (usually regions with low variance characteristics), and only use these regions for such computation. Nevertheless, such could also hurt performance for the remaining regions, thus an alternative would be to perform these computations for the entire image and for each region separately, and then combine these results (i.e. using weighted average methods based on importance, i.e. subjective impact, number of occurrence etc., of each region), to compute the final weighting matrices.

Figure 20:
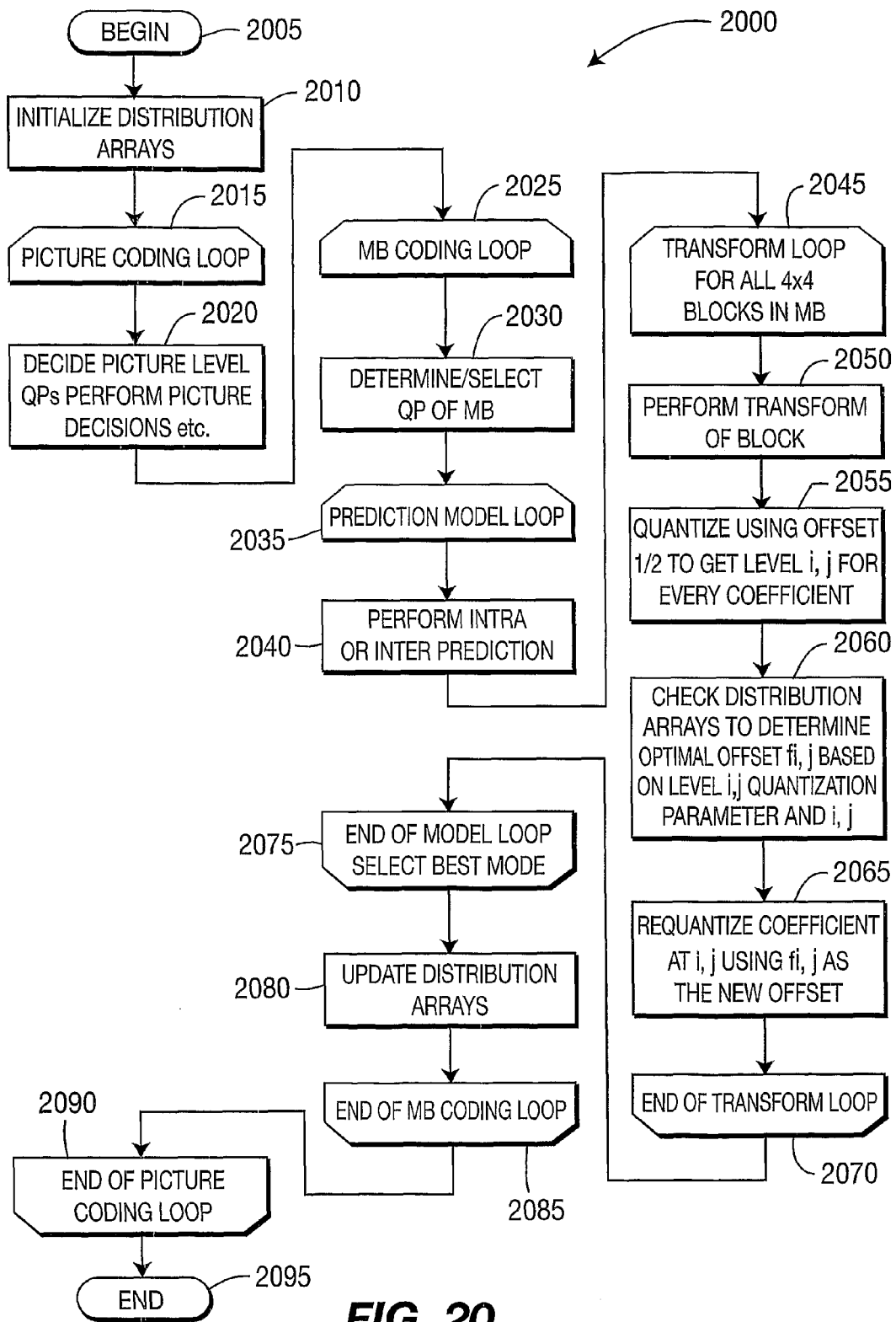
FIG. 20 shows a flow diagram for a method for quantization based on transform statistics at the picture level.

Turning to FIG. 20, a method for quantization based on transform statistics at the picture level is generally indicated by the reference numeral 2000. The method 2000 is practiced with respect to encoding of image data.

A begin block 2005 passes control to a function block 2010. The function block 2010 initializes distribution arrays, and passes control to a loop limit block 2015. The loop limit block 2015 begins a picture coding loop, and passes control to a function block 2020. The function block 2020 decides picture level quantization parameters, performs picture decisions, and so forth in preparation for encoding, and passes control to a loop limit block 2025. The loop limit block 2025 begins a macroblock coding loop, and passes control to a function block 2030. The function block 2030 determines/selects the quantization parameter of a current macroblock being processed, and passes control to a loop limit block 2035. The loop limit block 2035 begins a prediction mode loop, and passes control to a function block 2040. The function block 2040 performs intra or inter prediction with respect to the current macroblock, and passes control to a loop limit block 2045. The loop limit block 2045 begins a transform loop for all 4×4 blocks (in the current macroblock being processed), and passes control to a function block 2050. The function block 2050 performs a transform of a current 4×4 block being processed, and passes control to a function block 2055. The function block 2055 quantizes the current 4×4 block using an offset of ½ to obtain level $_{i,j}$ for every transform coefficient, and passes control to a function block 2060. The function block 2060 checks the distribution arrays to determine the optimal offset $f_{i,j}$ based on the level $_{i,j}$ quantization parameter and l, j, and passes control to a function block 2065. The function block 2065 requantizes the coefficient at position l, j using $f_{i,j}$ as the new offset, and passes control to a loop limit block 2070. The loop limit block 2070 ends the transform loop and passes control to a loop limit block 2075. The loop limit block 2075 ends the prediction mode loop and passes control to a function block 2080. The function block 2080 updates the distribution arrays, and passes control to a loop limit block 2085. The loop limit block 2085 ends the MB coding loop and passes control to a loop limit block 2090. The loop limit block 2090 ends the picture coding loop and passes control to an end block 2095.

Figure 21:
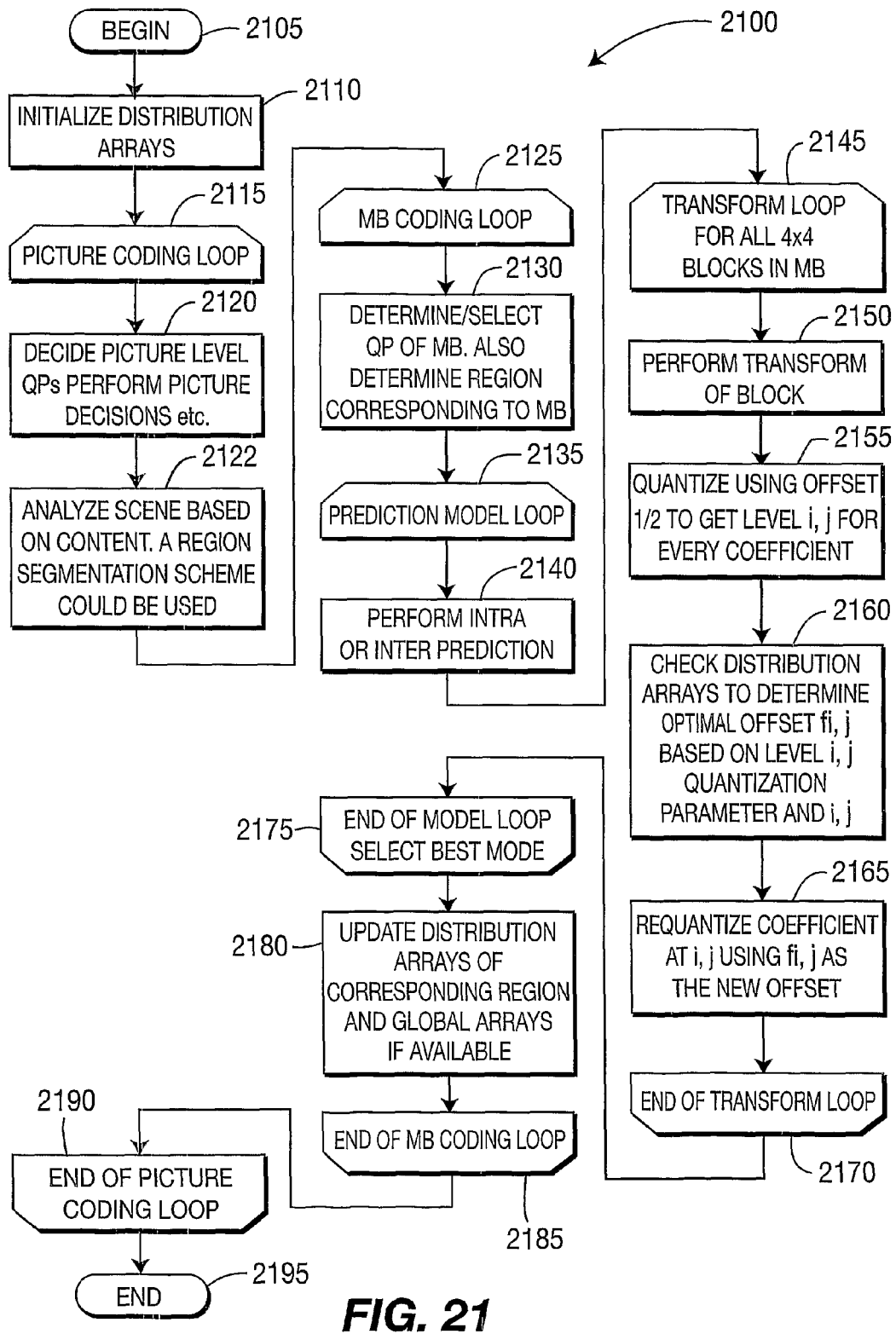
FIG. 21 shows a flow diagram for a method for quantization based on transform statistics at the picture level.

Turning to FIG. 21, a method for quantization based on region consideration is generally indicated by the reference numeral 2100. The method 2100 is practiced with respect to encoding of image data.

A begin block 2105 passes control to a function block 2110. The function block 2110 initializes distribution arrays, and passes control to a loop limit block 2115. The loop limit block 2115 begins a picture coding loop, and passes control to a function block 2120. The function block 2120 decides picture level quantization parameters, performs picture decisions, and so forth in preparation for encoding, and passes control to a function block 2122. The function block 2122 analyzes a scene based on content (e.g., using a region segmentation scheme), and passes control to a loop limit block 2125. The loop limit block 2125 begins a macroblock coding loop, and passes control to a function block 2130. The function block 2130 determines/selects the quantization parameter of a current macroblock being processed, determines the region corresponding to the current macroblock, and passes control to a loop limit block 2135. The loop limit block 2135 begins a prediction mode loop, and passes control to a function block 2140. The function block 2140 performs intra or inter prediction with respect to the current macroblock, and passes control to a loop limit block 2145. The loop limit block 2145 begins a transform loop for all 4×4 blocks (in the current macroblock being processed), and passes control to a function block 2150. The function block 2150 performs a transform of a current 4×4 block being processed, and passes control to a function block 2155. The function block 2155 quantizes the current 4×4 block using an offset of ½ to obtain level $_{i,j}$ for every transform coefficient, and passes control to a function block 2160. The function block 2160 checks the distribution arrays for a corresponding region(s) to determine the optimal offset $f_{i,j}$ based on the level $_{i,j}$ quantization parameter and l, j, and passes control to a function block 2165. The function block 2165 requantizes the coefficient at position l, j using $f_{i,j}$ as the new offset, and passes control to a loop limit block 2170. The loop limit block 2170 ends the transform loop and passes control to a loop limit block 2175. The loop limit block 2175 ends the prediction mode loop and passes control to a function block 2180. The function block 2180 updates the distribution arrays of the corresponding region(s) and global arrays, if available, and passes control to a loop limit block 2185. The loop limit block 2185 ends the MB coding loop and passes control to a loop limit block 2190. The loop limit block 2190 ends the picture coding loop and passes control to an end block 2195.

Figure 22:
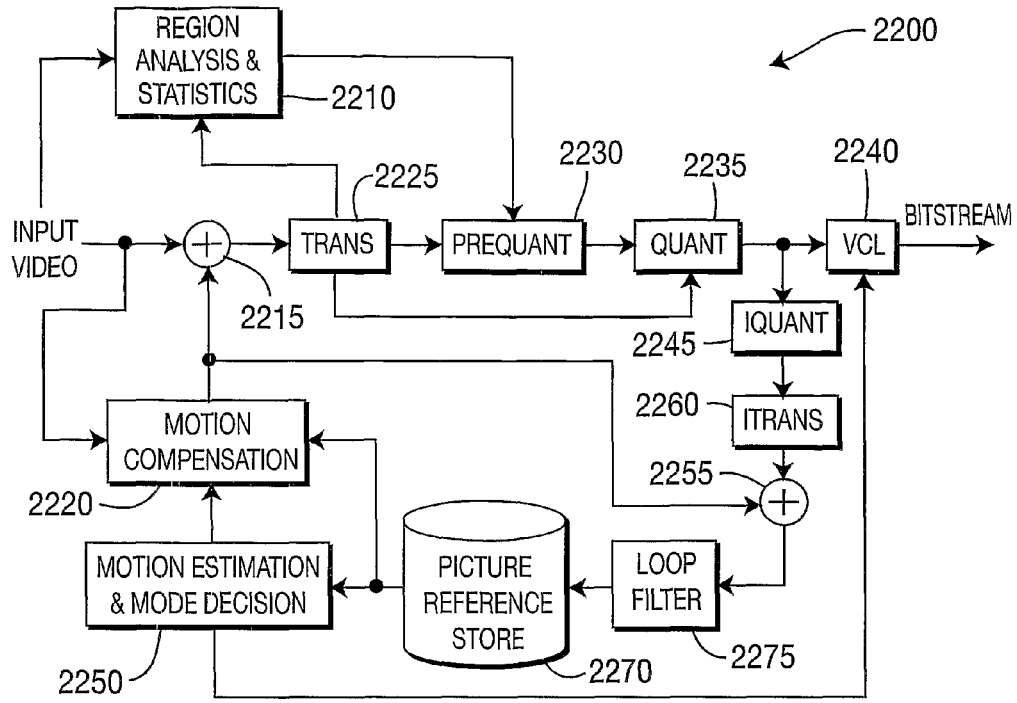
FIG. 22 shows a block diagram for an encoder with transform coefficient consideration for optimized quantization.

Turning to FIG. 22, an encoder with transform coefficient consideration for optimized quantization is generally indicated by the reference numeral 2200.

An input to the encoder 2200 is connected in signal communication with a first input of a region analysis and statistics module 2210, an inverting input of an adder 2215, and with a first input of a motion compensator 2220. An output of the adder 2215 is connected in signal communication with an input of a transformer 2225. A first output of the transformer 2225 is connected in signal communication with a second input of the region analysis and statistics module 2210. An output of the region analysis and statistics module 2210 is connected in signal communication with a first input of a prequantizer 2230. An output of the prequantizer 2230 is connected in signal communication with a first input of a quantizer 2235. A second output of the transformer 2225 is connected in signal communication with a second input of the quantizer 2235. A third output of the transformer 2225 is connected in signal communication with a second input of the prequantizer 2230. An output of the quantizer 2235 is connected in signal communication with a first input of a variable length coder (VLC) 2240 and an input of an inverse quantizer 2245. An output of the VLC 2240 is available as an output of the encoder 2200.

A first output of the motion compensator 2220 is connected in signal communication with a non-inverting input of the adder 2215 and a first input of an adder 2255. A second input of the motion compensator 2220 is connected in signal communication with a first output of a motion estimation and mode decision module 2250. An output of the inverse quantizer 2245 is connected in signal communication with an input of an inverse transformer 2260. An output of the inverse transformer 2260 is connected in signal communication with a second input of the adder 2255. An output of the adder 2255 is connected in signal communication with an input of a loop filter 2275. An output of the loop filter 2275 is connected in signal communication with an input of a picture reference store 2270. An output of the picture reference store is connected in signal communication with a third input of he motion compensator 2220 and an input of the motion estimation and mode decision module 2250. A second output of the motion estimation and mode decision module 2250 is connected in signal communication with a second input of the VLC 2240.

Figure 23:
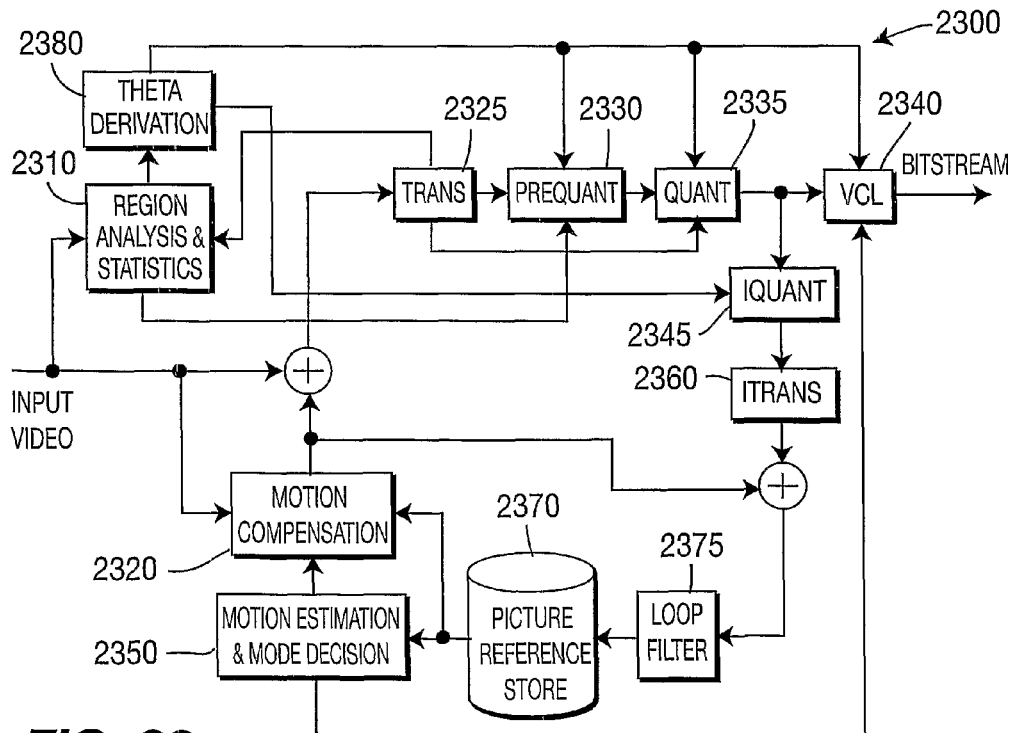
FIG. 23 shows a block diagram for an encoder with theta parameter and transform coefficient consideration for optimized quantization.

Turning to FIG. 23, an encoder with theta parameter and transform coefficient consideration for optimized quantization is generally indicated by the reference numeral 2300.

An input to the encoder 2300 is connected in signal communication with a first input of a region analysis and statistics module 2310, an inverting input of an adder 2315, and with a first input of a motion compensator 2320. An output of the adder 2315 is connected in signal communication with an input of a transformer 2325. A first output of the transformer 2325 is connected in signal communication with a second input of the region analysis and statistics module 2310. A first output of the region analysis and statistics module 2310 is connected in signal communication with a first input of a prequantizer 2330. An output of the prequantizer 2330 is connected in signal communication with a first input of a quantizer 2335. A second output of the transformer 2325 is connected in signal communication with a second input of the quantizer 2335. A third output of the transformer 2325 is connected in signal communication with a second input of the prequantizer 2230. An output of the quantizer 2335 is connected in signal communication with a first input of a variable length coder (VLC) 2340 and a first input of an inverse quantizer 2345. An output of the VLC 2340 is available as an output of the encoder 2300.

A first output of the motion compensator 2320 is connected in signal communication with a non-inverting input of the adder 2315 and a first input of an adder 2355. A second input of the motion compensator 2320 is connected in signal communication with a first output of a motion estimation and mode decision module 2350. An output of the inverse quantizer 2345 is connected in signal communication with an input of an inverse transformer 2360. An output of the inverse transformer 2260 is connected in signal communication with a second input of the adder 2355. An output of the adder 2355 is connected in signal communication with an input of a loop filter 2375. An output of the loop filter 2375 is connected in signal communication with an input of a picture reference store 2370. An output of the picture reference store is connected in signal communication with a third input of he motion compensator 2320 and an input of the motion estimation and mode decision module 2350. A second output of the motion estimation and mode decision module 2350 is connected in signal communication with a second input of the VLC 2340.

A second output of the region analysis and statistics module 2310 is connected in signal communication with an input of a theta derivation module 2380. A first output of the theta derivation module 2380 is connected in signal communication with a second input of the inverse quantizer 2345. A second output of the theta derivation module 2380 is connected in signal communication with a third input of the prequantizer 2330, a third input of a quantizer 2335, and with a third input of the VLC 2340.

Figure 24:
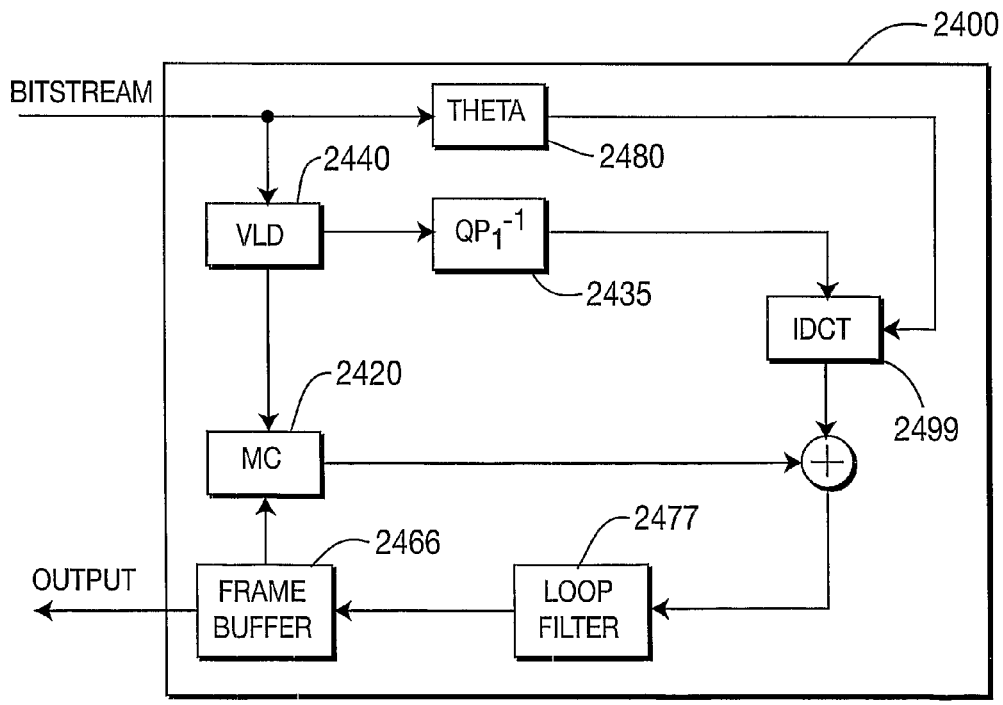
FIG. 24 shows a block diagram for a decoder.

Turning to FIG. 24, a decoder is generally indicated by the reference numeral 2400. An input of the decoder 2400 is connected in signal communication to an input of a theta derivation module 2480 and to an input of a variable length decoder (VLD) 2440. An output of the theta derivation module 2480 is connected in signal communication with a first input of an inverse discrete cosine transform (IDCT) module 2499. A first output of the VLD 2440 is connected in signal communication with a first input of a motion compensator 2420. A second output of the VLD 2440 is connected in signal communication with an input of a quantizer 2435. An output of the quantizer 2435 is connected in signal communication with a second input of the IDCT module 2499. An output of the ICDT module 2499 is connected in signal communication with a first input of an adder 2488. An output of the motion compensator 2420 is connected in signal communication with a second input of the adder 2488. An output of the adder 2488 is connected in signal communication with an input of a loop filter 2477. An output of the loop filter 2477 is connected in signal communication with an input of a frame buffer 2466. A first output of the frame buffer 2466 is connected in signal communication with a second input of the motion compensator 2420. A second output of the frame buffer 2466 is available as an output of the decoder 2400.

A description will now be given of some of the many attendant advantages/features of the present invention, according to various illustrative embodiments of the present invention. For example, one advantage/feature is an encoding apparatus and method in which dead-zone quantization is performed adaptively by considering coefficient position and associated distribution. Another advantage/feature is the encoding apparatus and method as described above, wherein adaptation is performed depending on at least one of coding mode (intra or inter), color component, transform size, and if necessary field and frame macroblock coding modes. Yet another advantage/feature is the encoding apparatus and method with adaptation as described above, wherein distribution statistics are collected separately for each different case. A further advantage/feature is the encoding apparatus and method with adaptation as described above, wherein distribution statistics are collected based on region characteristics (variance, edges, and so forth). A still further advantage/feature is the encoding apparatus and method as described above, wherein dead-zone quantization is performed in a two step method, first to determine a preliminary level using a fixed dead-zone/rounding control, and then based on this level repeat the quantization using a level dependent dead-zone/rounding control. Also, another advantage/feature is the encoding apparatus and method with 2-step dead-zone quantization as described above, wherein the level dependent rounding control is computed based on the piecewise distribution within that level. Moreover, another advantage/feature is the encoding apparatus and method with 2-step dead-zone quantization and level dependent rounding control as described above, wherein computation is performed using distribution concentrations (distribution areas) within the reconstruction area. Further, another advantage/feature is the encoding apparatus and method with 2-step dead-zone quantization and also with level dependent rounding control, wherein arithmetic integral methods, such as the trapezoid or simplex approximation methods are used to compute the level dependent rounding control. Additionally, another advantage/feature is the encoding apparatus and method with 2-step dead-zone quantization as described above, wherein distortion is also considered within the computation. Moreover, another advantage/feature is the encoding apparatus and method as described above, wherein certain coefficients originally set to level zero are instead forced to a higher level, in an attempt to improve subjective quality. Also, another advantage/feature is the encoding apparatus and method with coefficient level forcing as described above, wherein such decision is based on Rate Distortion Optimized criteria. Further, another advantage/feature is the encoding apparatus and method as described above, wherein dead-zone quantization is refined through the transmission and consideration of a set of offsetting quantization matrices $\Theta$. Also, another advantage/feature is the encoding apparatus and method with dead-zone quantization refined through offsetting matrices as described above, wherein $\Theta$ values have different impact at different levels. Moreover, another advantage/feature is the encoding apparatus and method with dead-zone quantization refined through offsetting matrices as described above, wherein $\Theta$ is computed based on image statistics and coefficient distributions. Further, another advantage/feature is the encoding apparatus and method with dead-zone quantization refined through offsetting matrices and $\Theta$ computed based on image statistics and coefficient distribution as described above, wherein $\Theta$ is computed using distribution concentrations (distribution areas) within the reconstruction area. Additionally, another advantage/feature is the encoding apparatus and method with dead-zone quantization refined through offsetting matrices and $\Theta$ computed based on image statistics and coefficient distribution and on distribution concentrations as described above, wherein arithmetic integral methods, such as the trapezoid or simplex approximation methods are used to compute $\Theta$. Further, another advantage/feature is the encoding apparatus and method with dead-zone quantization refined through offsetting matrices and $\Theta$ computed based on image statistics and coefficient distribution and on distribution concentrations as described above, wherein distortion is also considered for the computation of $\Theta$. Moreover, another advantage/feature is the encoding apparatus and method with dead-zone quantization refined through offsetting matrices as described above, wherein $\Theta$ computation can be adjusted depending on the maximum percentage of coefficients allowed to be coded using level zero. A still further advantage/feature is the encoding apparatus and method as described above, wherein dead-zone quantization considers weighted quantization matrices that are computed based on the distribution characteristics for all coefficients. Another advantage/feature is the encoding apparatus and method with adaptation, distribution statistic collection based on region characteristics, and dead-zone quantization with weighted matrices computer based on distribution characteristics for all coefficients as described above, wherein only distribution of "most significant regions" is considered for this computation. Moreover, another advantage/feature is the encoding apparatus and method with adaptation, distribution statistic collection based on region characteristics, and dead-zone quantization with weighted matrices computer based on distribution characteristics for all coefficients as described above, wherein all different regions are considered for the computation of weighted matrices through the use of a weighted averaging method based on subjective impact and occurrence statistics.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software.

Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. An encoder for encoding video signal data for an image block, comprising:
    a quantizer for receiving transform coefficients for the image block, and for adaptively performing dead-zone quantization based on coefficient positions and coefficient distributions of the transform coefficients to form quantization levels, wherein said quantizer adaptively performs the dead-zone quantization by determining a preliminary quantization level using a fixed dead-zone/rounding control, and repeating the dead-zone quantization based on the preliminary quantization level and using a coefficient quantization level dependent dead-zone/rounding control; and
    an inverse quantizer for de-quantizing the quantization levels to generate reconstructed levels, wherein a rounding parameter used for de-quantizing a quantization level of a transform coefficient is determined by the quantization level.

2. The encoder as defined in claim 1, wherein said quantizer computes the level dependent dead-zone/rounding control based upon a piecewise distribution within a corresponding level.

3. The encoder as defined in claim 2, wherein said quantizer computes the level dependent dead-zone/rounding control using distribution concentrations with a reconstructed area of the image block.

4. The encoder as defined in claim 1, wherein said quantizer computes the level dependent dead-zone/rounding control using an arithmetic integral process.

5. The encoder as defined in claim 4, wherein the arithmetic integral process comprises at least one of a trapezoid approximation process and a simplex approximation process.

6. The encoder as defined in claim 1, wherein said quantizer computes the level dependent dead-zone/rounding control based on distortion present in the transform coefficients.

7. The encoder as defined in claim 1, wherein said quantizer forces at least some of the transform coefficients to a higher quantization level to improve subjective quality, when the at least some of the transform coefficients were originally set to a level zero.

8. The encoder as defined in claim 7, wherein said quantizer determines whether to force the at least some of the transform coefficients to the higher level based on rate distortion optimized criteria.

9. A method for encoding video signal data for an image block, comprising the steps of:
    receiving transform coefficients for the image block;
    adaptively performing dead-zone quantization based on coefficient positions and coefficient distributions of the transform coefficients to form quantization levels, wherein said step of adaptively performing the dead-zone quantization comprises the steps of:
        initially performing the dead-zone quantization by determining a preliminary quantization level using a fixed dead-zone/rounding control; and
        repeating the dead-zone quantization based on the preliminary quantization level and using a coefficient quantization level dependent dead-zone/rounding control; and
    de-quantizing the quantization levels to reconstructed levels, wherein a rounding parameter used for de-quantizing a quantization level of a transform coefficient is determined by the quantization level.

10. The method as defined in claim 9, further comprising the step of computing the level dependent dead-zone/rounding control based upon a piecewise distribution within a corresponding level.

11. The method as defined in claim 10, further comprising the step of computing the level dependent dead-zone/rounding control using distribution concentrations with a reconstructed area of the image block.

12. The method as defined in claim 9, further comprising the step of computing the level dependent dead-zone/rounding control using an arithmetic integral process.

13. The method as defined in claim 12, wherein the arithmetic integral process comprises at least one of a trapezoid approximation process and a simplex approximation process.

14. The method as defined in claim 9, further comprising the step of computing the level dependent dead-zone/rounding control based on distortion present in the transform coefficients.

15. The method as defined in claim 9, further comprising the step of forcing at least some of the transform coefficients to a higher quantization level to improve subjective quality, when the at least some of the transform coefficients were originally set to a level zero.

16. The method as defined in claim 15, wherein said forcing step comprises the step of determining whether to force the at least some of the transform coefficients to the higher level based on rate distortion optimized criteria.

* * * * *